(12) United States Patent
Hashimoto

(10) Patent No.: US 8,634,115 B2
(45) Date of Patent: Jan. 21, 2014

(54) IMAGE PROCESSING DEVICE AND IMAGE PROCESSING METHOD

(75) Inventor: Minoru Hashimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1346 days.

(21) Appl. No.: 12/404,560

(22) Filed: Mar. 16, 2009

(65) Prior Publication Data

US 2009/0244653 A1 Oct. 1, 2009

(30) Foreign Application Priority Data

Mar. 25, 2008 (JP) ................................. 2008-078909

(51) Int. Cl.
*H04N 1/46* (2006.01)
*H04N 1/32* (2006.01)
*H04N 1/04* (2006.01)

(52) U.S. Cl.
USPC .......... 358/505; 358/515; 358/501; 358/1.13; 358/468; 358/474; 358/448; 358/486

(58) Field of Classification Search
USPC ......... 358/505, 512–515, 468, 442, 501, 538, 358/474, 486, 448, 1.13
See application file for complete search history.

(56) References Cited

U.S. PATENT DOCUMENTS

| 7,301,681 | B2 | 11/2007 | Tabata et al. ................... 358/514 |
| 7,840,063 | B2 * | 11/2010 | Koyanagi et al. ............. 382/162 |
| 2004/0057763 | A1 * | 3/2004 | Kawai et al. ................... 399/367 |
| 2005/0243347 | A1 | 11/2005 | Hayaishi |

FOREIGN PATENT DOCUMENTS

JP 2004-274717 9/2004

OTHER PUBLICATIONS

Office Action dated Jan. 12, 2011 in Chinese application No. 200910132312.7.

* cited by examiner

*Primary Examiner* — Cheukfan Lee
(74) *Attorney, Agent, or Firm* — Fitzpatrick, Cella, Harper & Scinto

(57) ABSTRACT

To provide an image processing device and an image processing method capable of analyzing a code image on a document regardless whether it is a black-and-white document or a color one even when a mode is set in which "scanning is performed in a black-and-white scan mode and black-and-white image information acquired by the scanning is transmitted to a printing device". Based on an instruction from a controller part, the scanner part acquires black-and-white image data and color image data for the detection of a color code image and transmits them to the controller part. The black-and-white image data is transmitted using bits 7 to 0 of an image data bus and the above-mentioned color image data is transmitted using bits 23 to 16 of the image data bus. The controller part analyzes a code image in the document based on the image data transmitted from the scanner part.

11 Claims, 20 Drawing Sheets

2,7,6,3=101,111,110,011

IMAGE PROCESSING DEVICE AND IMAGE PROCESSING METHOD

BACKGROUND OF THE INVENTION

1. Field of the Invention

The present invention relates to an image processing device and an image processing method and, in more detail, to an image processing device and an image processing method in which predetermined additional information (code image) is superimposed on image information.

2. Description of the Related Art

There exists a document on which a color (for example, cyan) code image (image of encoded additional information, such as specification of user disallowed or allowed to copy, and a function used in copying) is printed.

There also exists a reader (scanner etc.) capable of scanning with both the black-and-white scan mode and the color scan mode. In the black-and-white scan mode, light reflected from a document is received by a black-and-white sensor and black-and-white image information is transmitted to a controller and in the color scan mode, light reflected from a document is received by a color sensor and color image information is transmitted to the controller.

Compared to the color scan mode, the black-and-white scan mode has a drawback that color image information cannot be obtained even if a document is a color one.

On the other hand, compared to the black-and-white scan mode, the color scan mode has a drawback that there is a possibility that information of black on a document cannot be obtained accurately. For example, the information of black on a document may be recognized as "bluish black", "reddish black", or "greenish black". For example, a color sensor that receives reflected light by R, G, and B sensors, respectively, recognizes black as "bluish black", "reddish black", or "greenish black" when one amount of reflected light of the amount of reflected light R, the amount of reflected light G, and the amount of reflected light B deviates slightly.

As described above, the black-and-white scan mode has an advantage compared to the color scan mode while having the drawback.

Although the black-and-white scan mode has such an advantage, there is a problem as follows when the above-mentioned document is scanned (that is, light reflected from the document on which a color code image is printed is received by a black-and-white sensor and transmitted to a controller). That is, there is a problem that the possibility is high that the color code image printed on the above-mentioned document cannot be analyzed within the controller.

The reason for that is explained below.

First, because a color is paler than black, the black-and-white sensor will receive weak reflected light from a color code image. As a result, the analyzing component in the controller will receive information about a pale black-and-white code image representative of the color code image.

Further, it is impossible for the analyzing component within the controller to analyze the pale code image information. Consequently, when the above-mentioned document is scanned in the black-and-white scan mode, there is a problem that the possibility is high that the color code image printed on the above-mentioned document cannot be analyzed within the controller.

SUMMARY OF THE INVENTION

An object of the present invention is to provide an image processing device and an image processing method capable of analyzing a code image on a document regardless whether it is a black-and-white document or a color one even when a mode is set in which "scanning is performed in a black-and-white scan mode and black-and-white image information acquired by the scanning is transmitted to a printing device".

The present invention is an image processing device connected with an image reading device having a sensor that receives reflected light from a document, a component that performs image processing on data received from the sensor to acquire black-and-white image information, and a component that performs image processing on data received from the sensor to acquire color image information, the image processing device comprising: a component that transmits an instruction relating to the detection of a color code image in a black-and-white scan mode to the image reading device; a component that receives color image information for the detection of a color code image the component acquiring color image information has acquired from the image reading device based on the instruction; and a component that analyzes a code image in the document from the received color image information.

In addition, the present invention is an image processing device connected with an image reading device having a sensor that receives reflected light from a document, a component that performs image processing on data received from the sensor to acquire black-and-white image information, and a component that performs image processing on data received from the sensor to acquire color image information, the image processing device comprising: a component that transmits an instruction relating to the detection of a color code image in a black-and-white scan mode to the image reading device; a component that receives color image information for the detection of a color code image the component acquiring color image information has acquired from the image reading device based on the instruction; a component that determines whether or not to output black-and-white image information acquired by the component acquiring black-and-white image information to a printing device; and a component that analyzes a code image in the document from the received color image information for a determination by the determining component.

In addition, the present invention is an image processing device connected with an image reading device having a black-and-white sensor and a color sensor that receive reflected light from a document, the image processing device comprising a component that transmits an instruction relating to the detection of a color code image in the black-and-white scan mode to the image reading device, a component that receives information received via the black-and-white sensor and information received via the color sensor from the image reading device based on the instruction, and a component that analyzes a code image in the document from information received via the color sensor.

In addition, the present invention is an image processing device connected with an image reading device having a black-and-white sensor and a color sensor that receive reflected light from a document, the image processing device comprising a component that transmits an instruction relating to the detection of a color code image in the black-and-white scan mode to the image reading device, a component that receives information the black-and-white sensor has received and information the color sensor has received from the image reading device based on the instruction, a component that determines whether or not to cause a printing device to execute printing based on the received information the black-and-white sensor has received, and a component that analyzes a code image in the document using both the received information the black-and-white sensor has received and the received information the color sensor has received for a determination by the determining component.

In addition, the present invention is an image reading device connected with an image processing device having a component that analyzes a code image in a document, the image reading device comprising: a sensor that receives reflected light from the document; a component that performs image processing on data received from the sensor to acquire black-and-white image information; a component that performs image processing on data received from the sensor to acquire color image information; and a component that receives an instruction relating to the detection of a color code image in a black-and-white scan mode from the image processing device, wherein when receiving the instruction from the receiving component, the component acquiring color image information acquires color image information for the detection of a color code image from the data received from the sensor, and transmits the acquired color image information for the detection of a color code image and black-and-white image information used in printing to the image processing device.

In addition, the present invention is an image processing method in an image processing device connected with an image reading device having a sensor that receives reflected light from a document, a component that performs image processing on data received from the sensor to acquire black-and-white image information, and a component that performs image processing on data received from the sensor to acquire color image information, the method comprising the steps of: transmitting an instruction relating to the detection of a color code image in a black-and-white scan mode to the image reading device; receiving color image information for the detection of a color code image the component acquiring color image information has acquired from the image reading device based on the instruction; and analyzing a code image in the document from the received color image information.

In addition, the present invention is an image processing method in an image processing device connected with an image reading device having a sensor that receives reflected light from a document, a component that performs image processing on data received from the sensor to acquire black-and-white image information, and a component that performs image processing on data received from the sensor to acquire color image information, the method comprising the steps of: transmitting an instruction relating to the detection of a color code image in a black-and-white scan mode to the image reading device; receiving color image information for the detection of a color code image the component acquiring color image information has acquired from the image reading device based on the instruction; analyzing a code image in the document from the received color image information; and determining whether or not to output the black-and-white image information acquired by the component acquiring black-and-white image information to a printing device based on the analyzed code image.

In addition, the present invention is an image processing method in an image processing device connected with an image reading device having a black-and-white sensor and a color sensor that receive reflected light from a document, the method comprising the steps of: transmitting an instruction relating to the detection of a color code image in a black-and-white scan mode to the image reading device; receiving information received via the black-and-white sensor and information received via the color sensor from the image reading device based on the instruction; and analyzing a code image in the document from the information received via the color sensor.

In addition, the present invention is an image processing method in an image processing device connected with an image reading device having a black-and-white sensor and a color sensor that receive reflected light from a document, the method comprising the steps of: transmitting an instruction relating to the detection of a color code image in a black-and-white scan mode to the image reading device; receiving information the black-and-white sensor has received and information the color sensor has received, from the image reading device based on the instruction; analyzing a code image in the document using both the received information the black-and-white sensor has received and the received information the color sensor has received; and determining whether or not to cause a printing device to execute printing based on the received information the black-and-white sensor has received based on the analyzed code image.

In addition, the present invention is an image processing method in an image reading device connected with an image processing device having a component that analyzes a code image in a document, the method comprising the steps of: receiving an instruction relating to the detection of a color code image in a black-and-white scan mode from the image processing device; after receiving the instruction in the receiving step, receiving reflected light from a document and generating data read from the document; performing image processing on the generated data to acquire black-and-white image information; performing image processing on the generated data to acquire color image information, in which color image information for the detection of a color code image is acquired from the generated data; and transmitting the acquired color image information for the detection of a color code image and black-and-white image information used in printing to the image processing device.

According to the present invention, it is possible to analyze a color code image on a document even when the black-and-white scan mode is set, in which black-and-white image information is subjected to image processing and transmitted to a printing device.

Further features of the present invention will become apparent from the following description of exemplary embodiments (with reference to the attached drawings).

DESCRIPTION OF THE EMBODIMENTS

Figure 1:
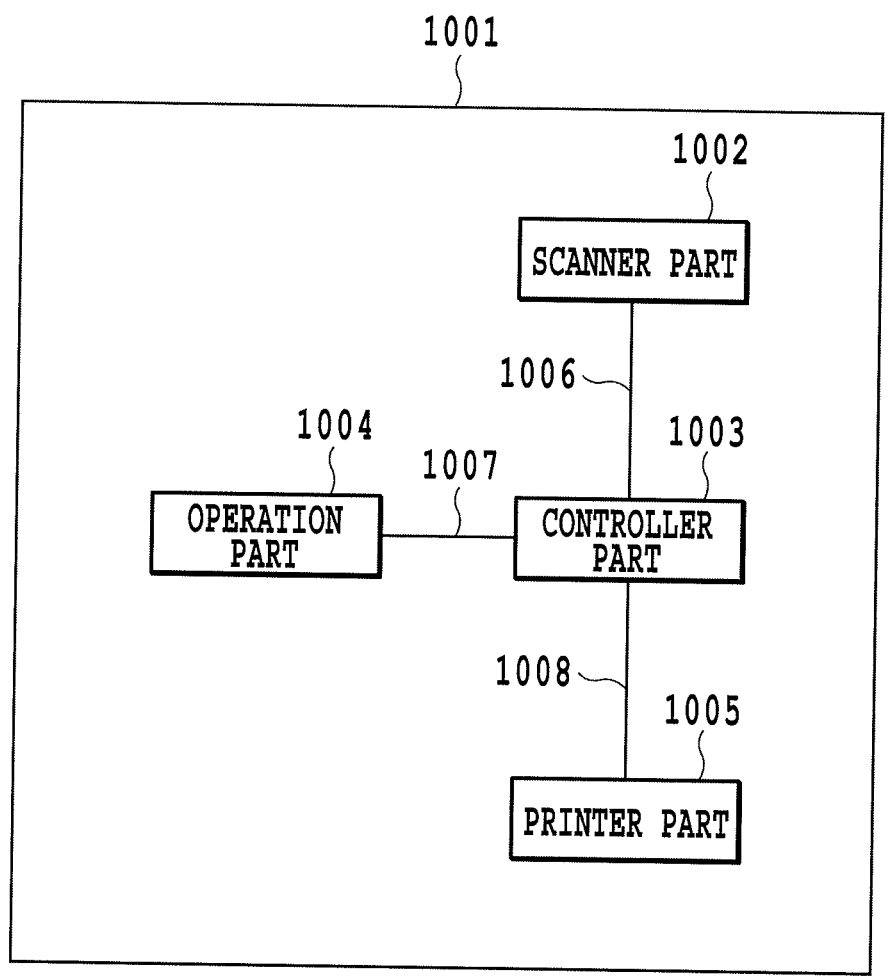
FIG. 1 is a diagram showing a general configuration of an image forming device in an embodiment of the present invention.

Embodiments of the present invention will be described below in detail with reference to the drawings. In the drawings to be described below, those which have the same function are assigned the same reference numerals and its duplicated description is omitted.

Before the embodiments of the present invention are described, an image forming device and an image processing device suitable for the application to the following embodiments will be described. First, a configuration of an image forming device is described, and then, a technique to embed information into paper in order to prevent illegal copying and a copy prohibiting operation in copying are described in this order.

<Configuration of an Image Forming Device>

FIG. 1 is a block diagram showing a general configuration of an image forming device in an embodiment of the present invention.

Reference numeral 1001 denotes an image forming device. A controller part 1003 is a block that controls each part in the operations such as copying, scanning and printing, and converts and stores image data. At the time of the operations, such as copying and scanning, a document is scanned into image data at a scanner part 1002 as an image reading device and then the image data is transferred to the controller part 1003 through a scan image data cable 1006. An operation part 1004 is an interface with a user and capable of screen display under the control by the controller part 1003, key inputting, and inputting to the controller part 1003 through a touch panel. The controller part 1003 and the operation part 1004 are connected through an operation part cable 1007. A printer part 1005 as a printing device is a block that forms an image of image data stored in the controller part 1003 on a recoding paper. The transfer of image data from the controller part 1003 to the printer part 1005 is performed through a print image data cable 1008.

The above-mentioned scan image data cable 1006 is constituted by a plurality of buses. Therefore, the controller part 1003 is connected with the scanner part 1002 via the plurality of buses.

Figure 2:
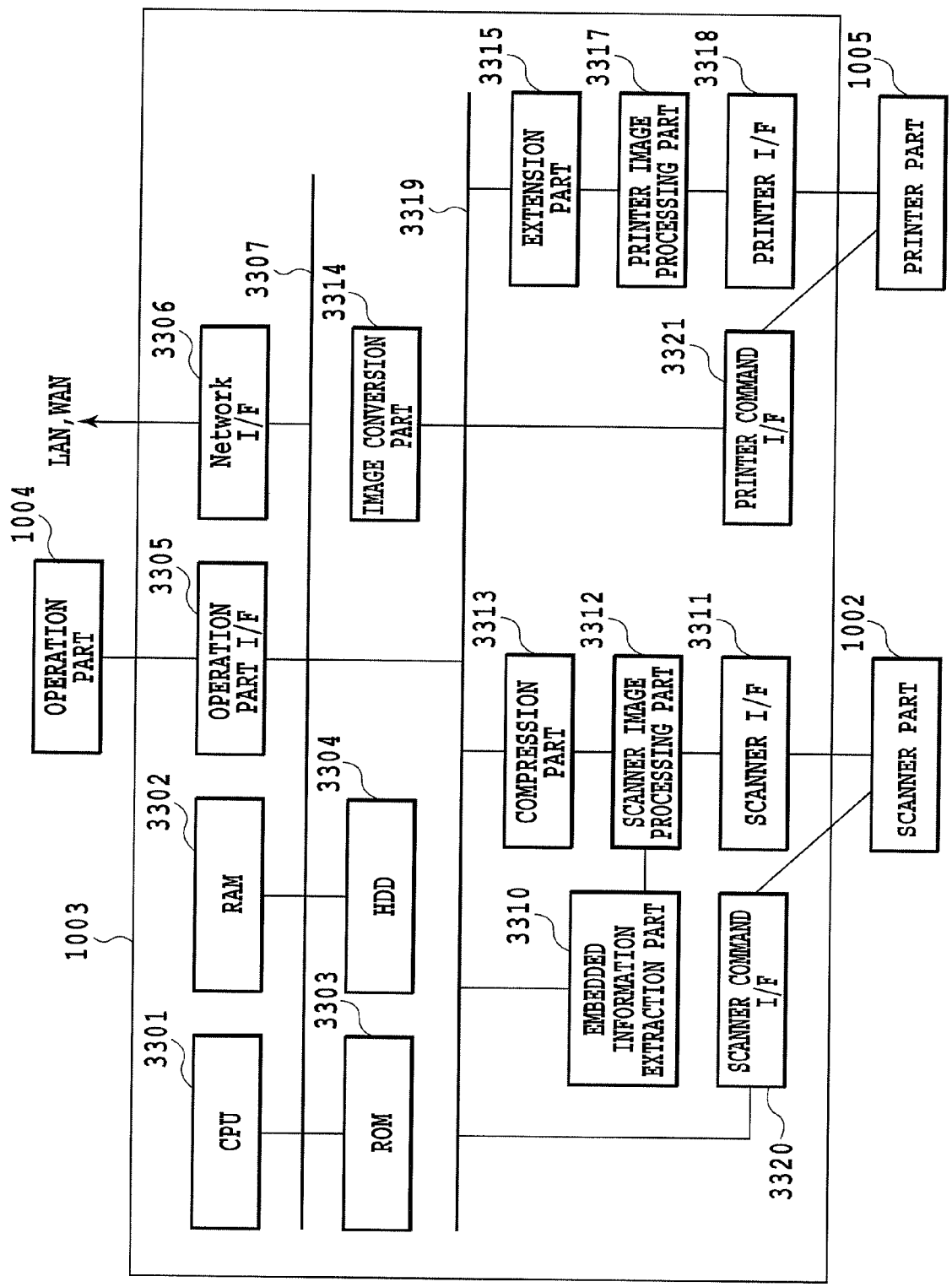
FIG. 2 is a block diagram showing an internal configuration of the image forming device in an embodiment of the present invention.

FIG. 2 is a block diagram for illustrating the configuration of the controller part 1003 of the image forming device 1001 in more detail.

A CPU 3301 totally controls various kinds of processing to be performed in the controller part 1003 as well as totally controlling accesses with individual parts based on control programs and the like stored in a ROM 3303. A RAM 3302 is a work memory by which the CPU 3301 operates and also a memory to temporarily store image data. In the ROM 3303, boot programs and the like of the device are stored. An HDD 3304 is a hard disc drive and capable of storing system software and image data.

An operation part I/F 3305 is an interface part that connects a system bus 3307 and the operation part 1004. The operation part I/F 3305 outputs information input from the operation part 1004 to the system bus 3307 as well as receiving image data to be displayed in the operation part 1004 from the system bus 3307 and outputting it to the operation part 1004.

A Network I/F 3306 connects to a LAN or a WAN and the system bus 3307, and inputs and outputs information. Reference numeral 3319 denotes an image bus, which is a transmission path to send and receive image data, constituted by a PCI bus or IEEE 1394.

A scanner image processing part 3312 corrects, processes, and edits image data received from the scanner part 1002 via a scanner I/F 3311. An embedded information extraction part 3310 detects a pattern embedded in a code image from the image data and performs extraction processing of additional information. That is, the embedded information extraction part 3310 analyzes a code image in a document.

A compression part 3313 receives image data and compresses the data. An extension part 3315 develops the data into a bit map image after extending it and then sends it to a printer image processing part 3317.

The printer image processing part 3317 receives image data sent from the extension part 3315 and performs image processing on the image data while referring to attribute data attached to the image data.

An image conversion part 3314 performs predetermined conversion processing on image data, such as rotation, color space conversion, two-value to multi-value conversion, image composition, and thinning.

A scanner command I/F 3321 is used when the CPU 3301 communicates with a CPU 3401 of the scanner part 1002. From the scanner part 1002, information about presence/absence of a document and presence/absence of an error is transmitted and from the controller part 1003, commands such as starting a scanning operation, setting of a scanning operation and image processing, are transmitted. The commands include selection of an output signal at a controller I/F part 3411.

<Explanation of Scanner Part 1002>

Figure 3:
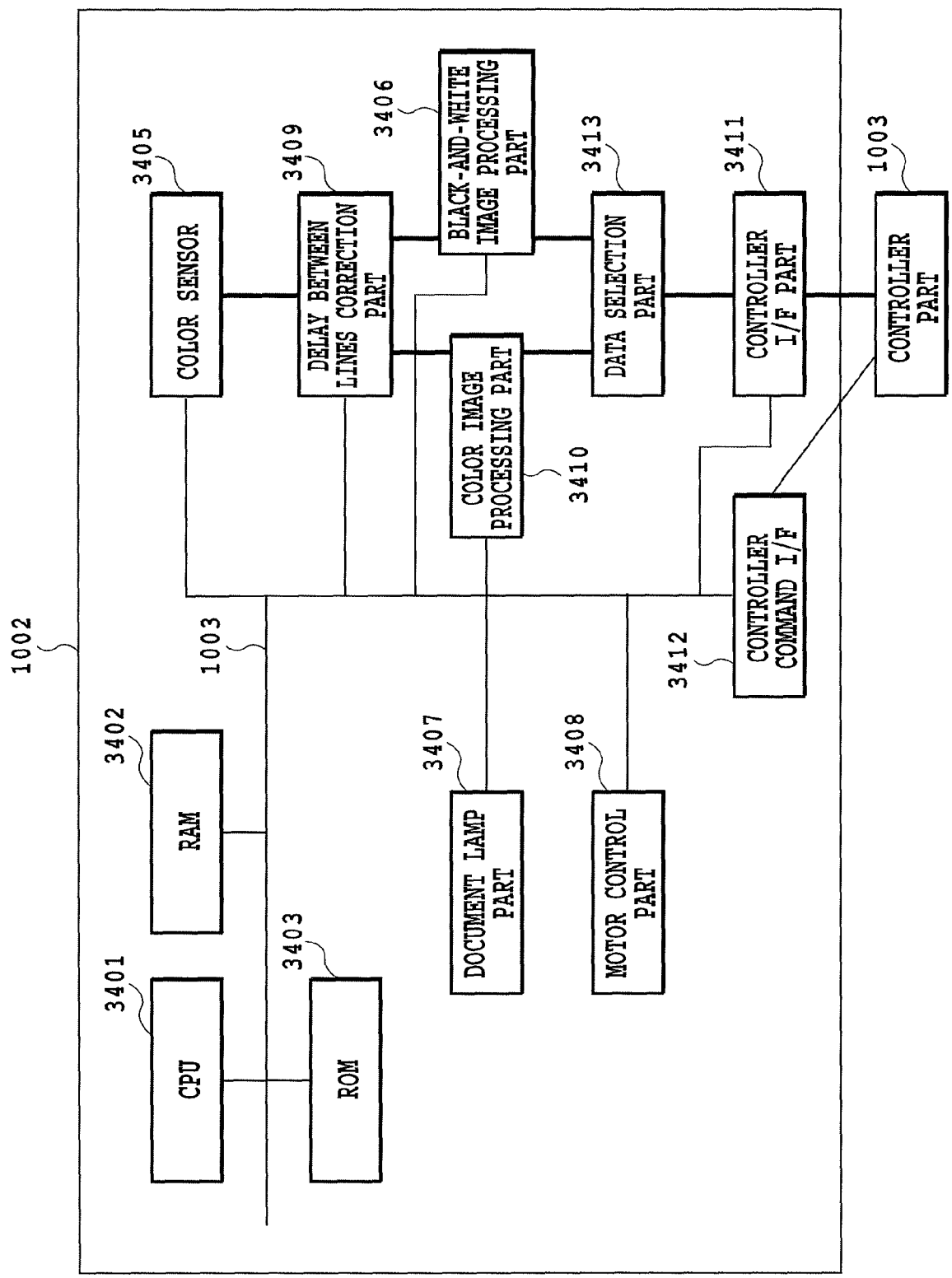
FIG. 3 is a block diagram showing details of an image reading device in an embodiment of the present invention.

FIG. 3 is a block diagram showing the details of the scanner part 1002 of the image forming device 1001.

The CPU 3401 controls each part of the scanner part 1002 while using a RAM 3402 as a work area according to the programs stored in a ROM 3403. A document lamp part 3407 is a lamp that illuminates a document to be scanned. A motor control part 3408 is a motor to operate a sensor, a feeding mechanism, etc., and a sensor to detect a position, and controlled by the CPU 3401.

A color sensor (RGB sensor) 3405 is a sensor that receives light reflected from a document illuminated from the document lamp 3407 and converts the intensity of the reflected light illuminated to the document into an electrical signal. There is an independent microsensor for each pixel and it is arranged in a row and with which it is possible to read the entire row at a time. For example, for paper of A4 size, 297 mm in the longer direction (main scan direction) can be read at a time. It is possible to obtain image data corresponding to one page by repeatedly reading while moving the color sensor 3405 in the direction of the shorter direction (sub scan direction) using a motor to move the sensor. The color sensor 3405 has independent sensors for R, G, and B for each pixel. They are put side by side in a row while being shifted in the sub scan direction. Because of this, the data of each color is read with shifted timings. A color image data (color image information) of 24 bits, that is, eight bits for each sensor, is obtained. That is, the color sensor 3405 outputs image data composed of the individual 8-bit R, G, and B luminance signals based on the above-mentioned received reflected light.

A delay between lines correction part 3409 is a memory that absorbs a difference between timings of data resulting from a difference in the position of the sensor of each color in the RGB sensor 3405, and data of R, G, and B of the same pixel is output with the same timing. This image data is subjected to image processing with an appropriate timing and processing content, however, it is controlled by the CPU 3401 in accordance with the purpose of the use of the image data.

In the present invention, there are a color scan mode in which color image data (color image information) is transmitted to the controller part 1003 and a black-and-white scan mode in which black-and-white image data (black-and-white image information) is transmitted, and the path through which image data is transmitted is different between the two modes.

In the color scan mode, the CPU 3401 sends the output from the delay between lines correction part 3409 to a color image processing part 3410. The color image processing part 3410 is a part at which gamma correction to correct the sensitivity of a sensor etc. and image processing, such as edge enhancement, are performed in order to obtain excellent color image data and outputs the color image data. As described above, the color image processing part 3410 performs image processing on the image information (luminance signal) received from the color sensor 3405 to generate color image data. The color image processing part 3410 outputs the generated color image data to a data selection part 3413.

On the other hand, when the black-and-white scan mode is selected, the CPU 3401 sends the output from the delay between lines correction part 3409 to a black-and-white image processing part 3406. The black-and-white image processing part 3406 converts the output of the color sensor 3405 into black-and-white one and performs image processing in order to obtain excellent black-and-white image data. The color image processing part 3410 outputs the generated black-and-white image data to the data selection part 3413.

By the control of the CPU 3401, in the data selection part 3413, input color image data and black-and-white image data are selected and they are output after the timing is adjusted. The controller I/F part 3411 has a memory to buffer the input signal and transmits the signal to the controller part 1003 after correcting the timing and the alignment of the image data. A controller command I/F 3412 is controlled by the CPU 3401 and communicates with the CPU 3301 of the controller part 1003.

Figure 9:
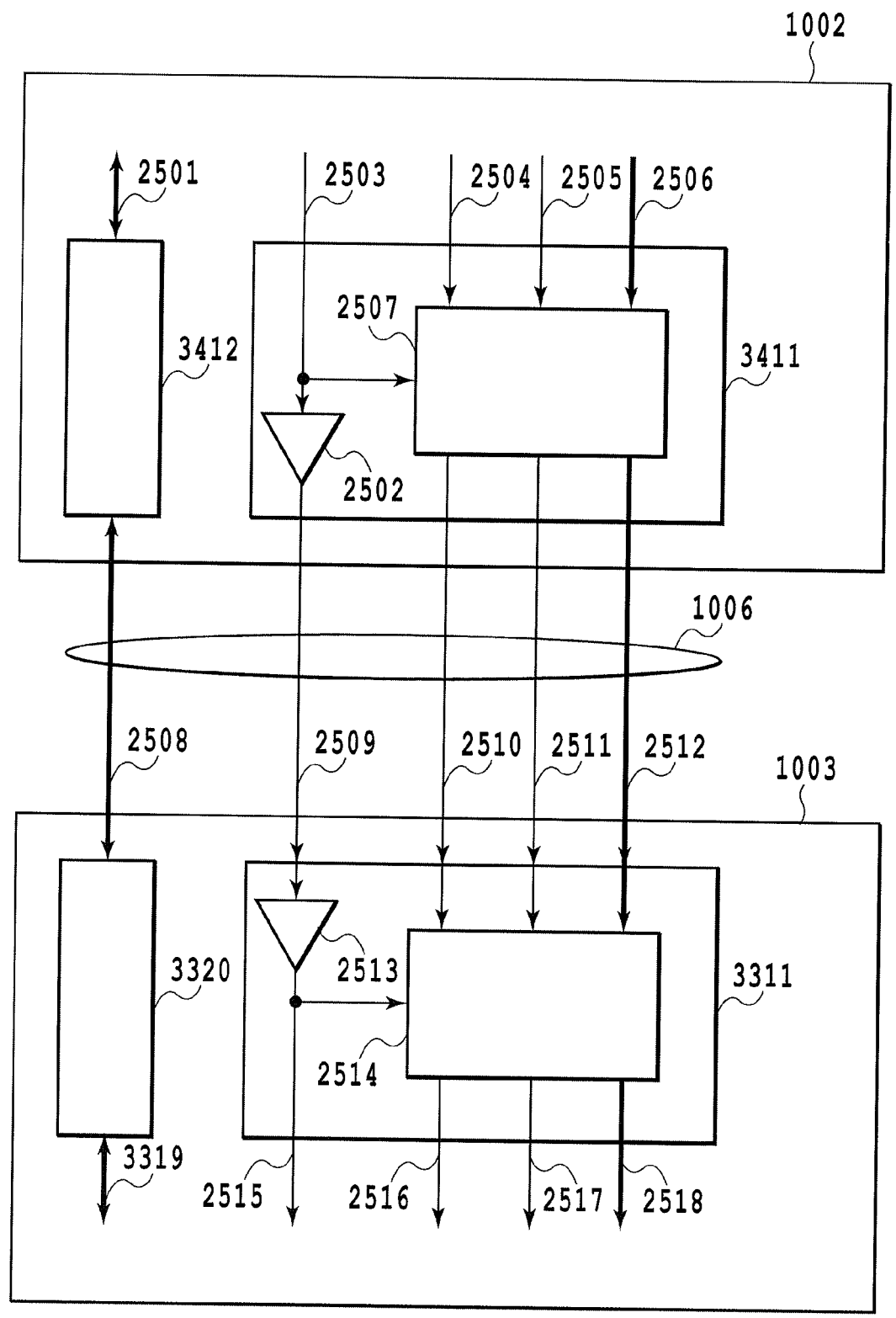
FIG. 9 is a diagram showing details of signals on a data cable that is connected between an image processing device and an image reading device in an embodiment of the present invention.

FIG. 9 is a diagram showing the details of the signals on the scan image data cable 1006 connected between the controller part 1003 and the scanner part 1002.

In FIG. 9, an image data bus 2506 is an image data bus consisting of 24 buses. A sub scan synchronization signal 2504 is a signal that becomes active at the head of a page. A main scan synchronization signal 2505 is a signal indicative of the head in the main scan direction. The main scan synchronization signal 2504, the sub scan synchronization signal 2505, and the image data bus 2506 are input into a flip-flop 2507 in order to align the timing. The output of the flip-flop 2507 is synchronized with an image clock signal 2503 and output to the controller part 1003 as an image data bus 2512, a sub scan synchronization signal 2510, and a main scan synchronization signal 2511.

An image clock signal 2509 is wave-shaped in a clock buffer 2502 and output to the controller part 1003. An image clock signal 2515 wave-shapes the image clock signal 2509 received from the scanner part 1002 in a buffer 2513. The main scan synchronization signal 2510, the sub scan synchronization signal 2511, and the image data bus 2512 output from the scanner part 1002 are synchronized with the image clock signal 2515 in a flip-flop 2514 in order to align the timing. The output from the flip-flop 2514 is input to the scanner image processing part 3312 as a main scan synchronization signal 2516, a sub scan synchronization signal 2517, and an image data bus 2518.

A communication bus 2508 is a bus that sends and receives a command between the CPU 3401 of the scanner part 1002 and the CPU 3301 of the controller part 1003. In the scanner part 1002, the signal of the communication bus 2508 and the signal of an internal bus 2501 are converted by the controller command I/F 3412. Similarly, the signal of the communication bus 2508 and the signal of the internal bus 3319 are converted by a scanner command I/F 3320 of the controller part 1003.

In an embodiment of the present invention, as will be described later with FIGS. 11, 12, the numbers of buses necessary for the controller part 1003 to receive image data from the scanner part 1002 are different between the color scan mode and the black-and-white scan mode.

Figure 11:
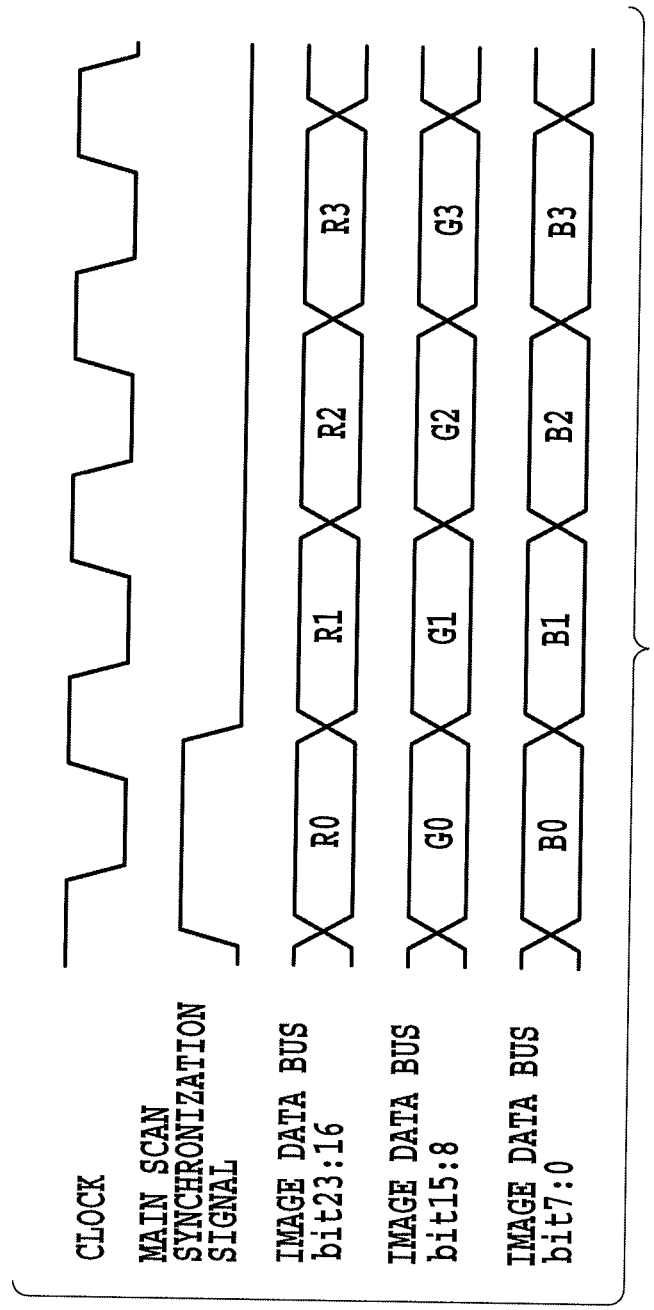
FIG. 11 is a diagram showing waveforms of image data to be transferred to an image processing device by an image reading device in the color scan mode in an embodiment of the present invention.

FIG. 11 is a diagram showing waveforms that show examples of the alignment of image data in the communication between the scanner part 1002 and the controller part 1003 in the color scan mode.

The clock signal 2509 is the one having a fixed period and the data of the main scan synchronization signal 2511 and the image data bus 2512 is synchronized with the clock signal 2509. Image data corresponding to one pixel can be transferred per clock. The image data bus is divided into three groups, that is, bits 23 to 16, bits 15 to 8, and bits 7 to 0, each consisting of eight bits of R, G, and B, respectively. The image data when the main scan synchronization signal 2511 is at the high level is the start point in the main scan direction.

Figure 12:
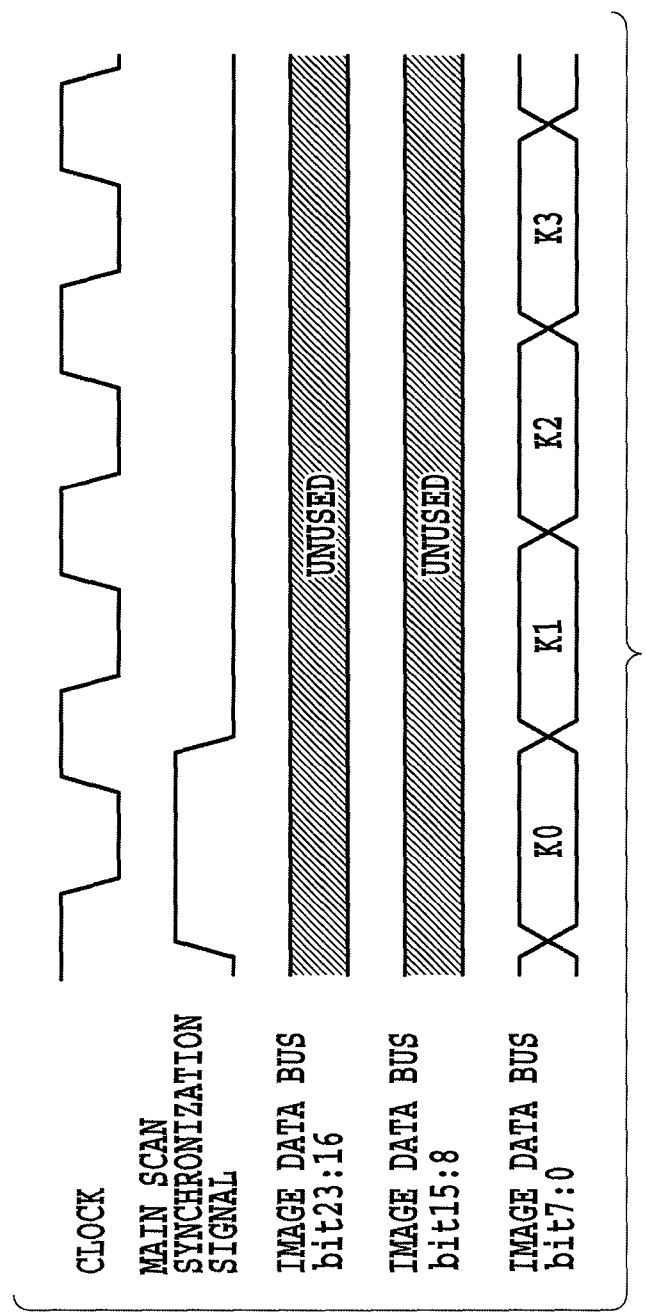
FIG. 12 is a diagram showing waveforms of image data to be transferred to the image processing device by the image reading device in the black-and-white scan mode in an embodiment of the present invention.

FIG. 12 is a diagram showing waveforms that show examples of the alignment of image data in the communication between the scanner part 1002 and the controller part 1003 in the black-and-white scan mode. In this mode, the image data is only 8-bit black-and-white image data and assigned to bits 7 to 0 of the image data bus. Bits 23 to 8 of the image data bus are not used. In an embodiment of the present invention, these unused bits are utilized to transfer color image data for the detection of a color code image.

Next, two-pixel parallel transfer will be described using FIG. 13.

As described previously, eight bits are used in the black-and-white scan mode and the amount of data is one third of that in the color scan mode in which 24 bits are used. Because of this, there is a type of a device in which the transfer rate is increased in the black-and-white scan mode than that in the color scan mode. However, changing the frequency of a clock signal brings about a problem that the clock circuit is made complicated and the cost is increased. Because of this, two-pixel parallel transfer is proposed as a technique to perform data transfer at a high rate with the same clock signal frequency as that in the color scan mode.

Figure 13:
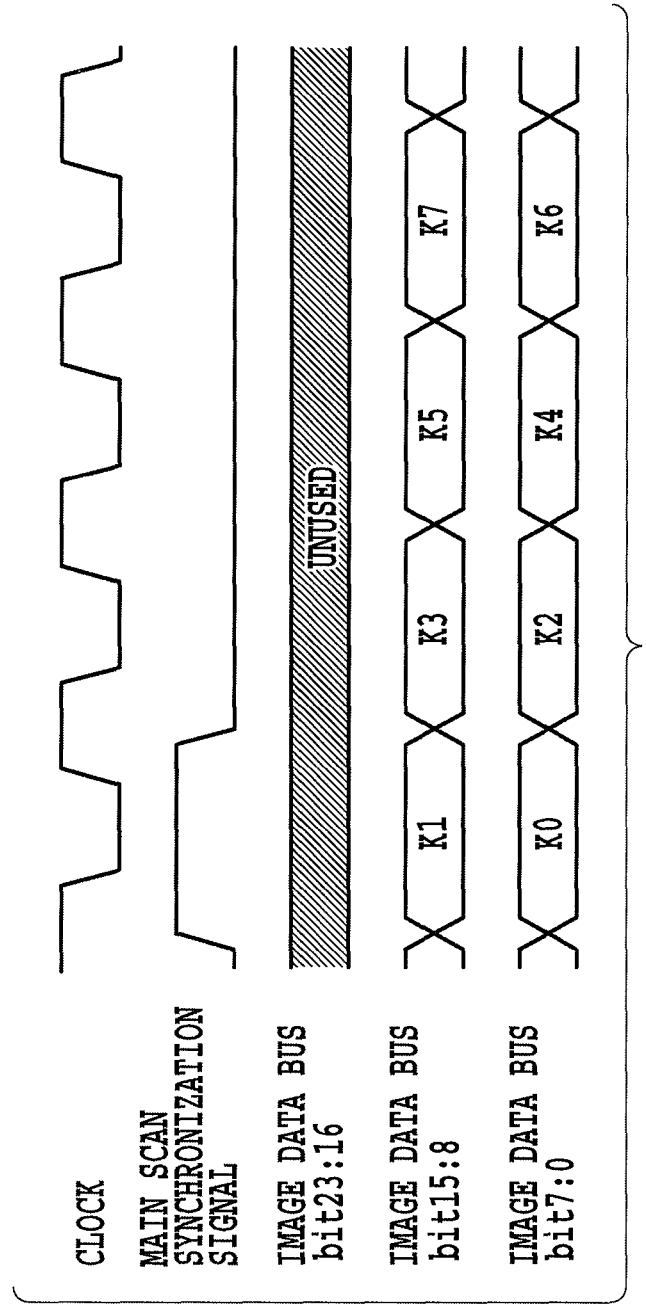
FIG. 13 is a diagram showing waveforms of image data to be transferred to the image processing device by the image reading device when two-pixel parallel transfer is performed in the black-and-white scan mode in an embodiment of the present invention.

FIG. 13 is a diagram showing waveforms in the case of two-pixel parallel transfer from the scanner part 1002 to the controller part 1003 when the black-and-white scan mode is set.

Image data corresponding to two pixels can be transferred per clock. Odd-numbered pixels of the black-and-white image data are assigned to bits 7 to 0 of the image data bus and even-numbered pixels are assigned to bits 15 to 8 of the image data bus. Consequently, transfer will be completed in a time half that in the embodiment shown in FIG. 12. Assignment is done so that data corresponding to two pixels is transmitted in one clock using a memory provided in the controller I/F part 3411 of the scanner part 1002.

Figure 20:
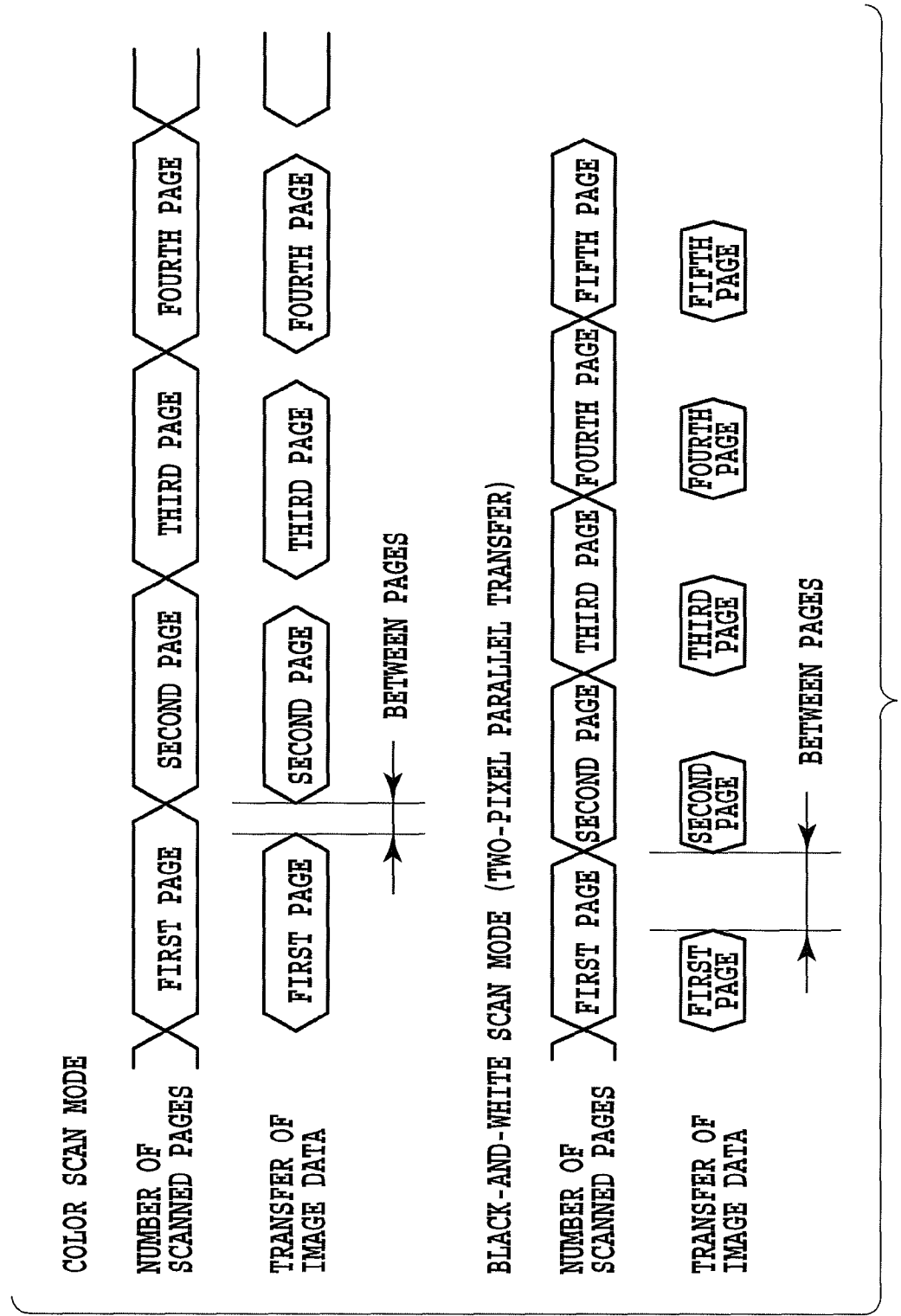
FIG. 20 is a diagram for explaining a difference in the transfer rate between the black-and-white scan mode in which two-pixel parallel transfer is performed and the color scan mode in an embodiment of the present invention.

However, also in the case where two-pixel parallel transfer is performed as shown in FIG. 20, bits 23 to 16 of the image data bus are not used. In addition, in many cases, the scan rate is increased by a factor of about 1.2 while the data transfer rate is doubled by performing the two-pixel parallel transfer. This is because there are restrictions of the image processing rate, the performance of the motor, and the image forming rate in the printer part. Consequently, there is a larger time margin between pages in the image data transfer compared to that in the color scan mode.

That is, in the black-and-white scan mode, there exists an unused image data bus, and therefore, the two-pixel parallel transfer can be performed using the unused image data bus. Then, by performing the two-pixel parallel transfer in the black-and-white scan mode, the data transfer rate of the bus necessary for the controller part 1003 to receive image data from the scanner part 1002 is made different between the color scan mode and the black-and-white scan mode. That is, the data transfer rate when the color scan mode is set is higher than that when the black-and-white scan mode is set. On the other hand, the difference in the scan rate at which one page is scanned between the color scan mode and the black-and-white scan mode is not so large as that in the data transfer rate as described above. Because of this, when the above-mentioned black-and-white scan mode is performed, the above-mentioned larger time margin is generated than when the color scan mode is performed due to the difference in the data transfer rate of the bus between the color scan mode and the black-and-white scan mode in which the two-pixel parallel transfer is used. That is, in the black-and-white scan mode in which the two-pixel parallel transfer is performed, a larger time margin is generated between when the transfer of the image data obtained by scanning a certain page is completed and when the scanning of the next page is commenced compared to that in the color scan mode.

In an embodiment of the present invention, this time margin is utilized in the transfer of color image data for the detection of a color code image.

The internal configuration of the image forming device 1001 is described as above, and next, a technique to embed information into image data shown in FIG. 4 will be described.

<Information Embedding Technique>

As a preferred example of the information embedding technique according to an embodiment of the present invention, LVBC (Low Visibility Barcodes) will be described.

The above-mentioned LVBC is a technique to embed additional information by shifting the position of a plurality of small dots arranged in a grid pattern. It is required for the dot detection rate to be high in order to extract embedded information from a code image that uses LVBC. In particular, when the technique is applied to the security functions, such as copy prohibition, the required level is high. On the other hand, dots that do not exist on an original document are added, and therefore, it is desirable that they be as visually inconspicuous as possible.

As a method of making dots thus embedded visually inconspicuous, a method is proposed, which uses cyan, yellow, etc., less conspicuous than black, as a color of dots that form an image on a document when forming a code image. In this manner, by adopting color dots in LBVC, it is possible to embed a visually inconspicuous code image in a document.

Figure 4:
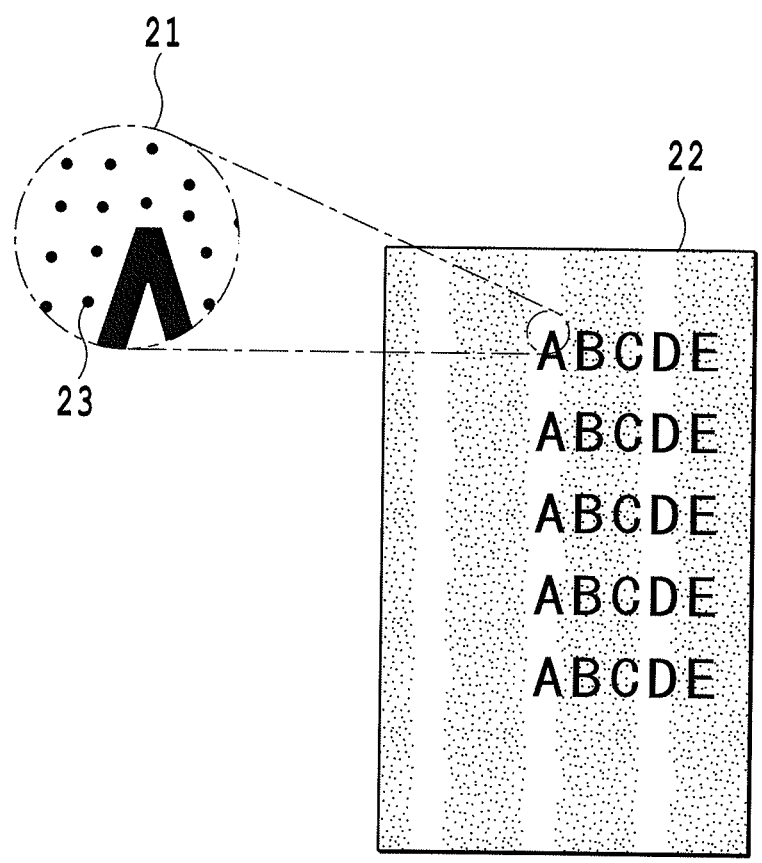
FIG. 4 is a diagram showing an example of a document in which information is embedded in an embodiment of the present invention.

FIG. 4 is an image diagram showing an example of a document in which LVBC is embedded.

Reference numeral 22 denotes an entire recording medium as a document and reference numeral 21 denotes an enlarged view of the document 22. In the enlarged view 21, a number of dots (for example, a dot 23) seeming randomly embedded are seen in addition to an image that should be originally drawn. Using the dot, digital data desired to be embedded in a printed document is embedded. Hereinafter, information to be embedded (code image information) is referred to as additional information.

Next, an image into which additional information has been embedded using LVBC will be described.

Figure 6:
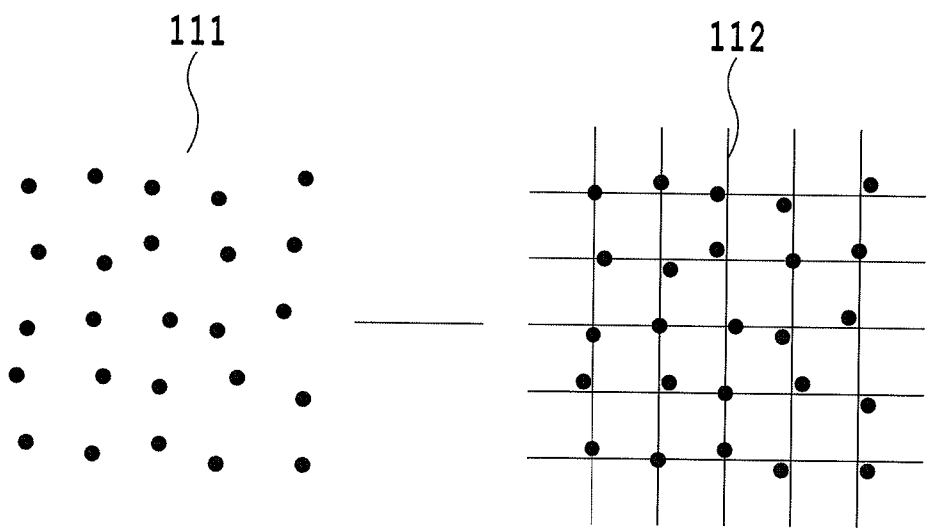
FIG. 6 is a diagram illustrating a grid of dots in an embodiment of the present invention.

In the case of LVBC, a dot pattern called a grid is embedded in addition to an image that should be originally printed on recording paper. In FIG. 6, a dot 111 shows a grid dot that constitutes a grid. Reference numeral 112 denotes a grid and the grid 112 itself is a collection of dots spaced both vertically and horizontally at identical intervals.

Additional information is input as binary (two-valued) data less than or equal to a fixed size. The embedment of additional information is realized by the displacement (from the center position) in eight vertical, horizontal, and diagonal directions with respect to the dot constituting the grid.

Figure 7:
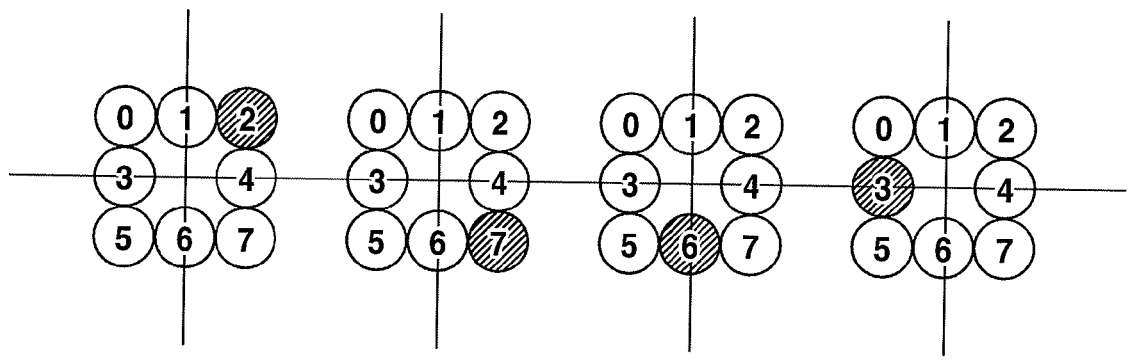
FIG. 7 is an explanatory diagram in which data is represented by the displacement of the grid in an embodiment of the present invention.

FIG. 7 is a diagram showing an example, in which binary data 010111110011b is embedded as additional information. The data 010111110011b is divided into groups of three bits, that is, 010, 111, 110, and 011. Further, the individual groups of three bits are subjected to decimal conversion and converted into 2, 7, 6, and 3. As shown in the upper diagram in FIG. 7, it is possible to represent information by displacing each dot constituting the grind in any of the eight vertical, horizontal, and diagonal directions corresponding to a numerical value. In this case, it is possible to embed information 2, 7, 6, and 3 by displacing the dot to the upper-right, lower-right, bottom, and left. By the repetition of such processing, additional information is embedded into a recording medium (recording paper etc.). By further embedding a dot representative of additional information into the recording medium many times, the degree of redundancy is increased and thus the reliability can be improved against the erroneous recognition of an image and stains, wrinkles, and partial destruction of the recording medium.

In the present invention, LVBC is described as an example, however, the present invention can be adapted to other embedment methods.

<Detection of Color Dot in Black-and-White Scan Mode>

Next, problems that arise when detecting a color dot in the black-and-white scan mode will be described using Table 1.

TABLE 1

| COLOR ON DOCUMENT | VALUE READ IN COLOR SCAN MODE | VALUE READ IN BLACK-AND-WHITE SCAN MODE |
|---|---|---|
| WHITE | R = 255, G = 255, B = 255 | K = 255 |
| BLACK | R = 0, G = 0, B = 0 | K = 0 |
| YELLOW | R = 255, G = 255, B = 0 | K = 170 |
| CYAN | R = 255, G = 0, B = 255 | K = 170 |

Before the above-mentioned problems are described, the black-and-white scan mode will be described.

In an embodiment of the present invention, a scanner as an image reading device capable of performing the black-and-white scan mode can mainly take the following two configurations.

First scanner configuration: A configuration as shown in FIG. 3, in which black-and-white image data is generated from the output acquired by a color sensor built in the scanner and capable of outputting R, G, and B color luminance signals in the black-and-white scan mode. With the first scanner configuration, conversion processing from the output of the color sensor into black-and-white image data is performed in a scanner unit. This has an advantage that the independence of the unit is enhanced and that the burden of the processing performed in an image processing device and an image forming device can be reduced.

Figure 18:
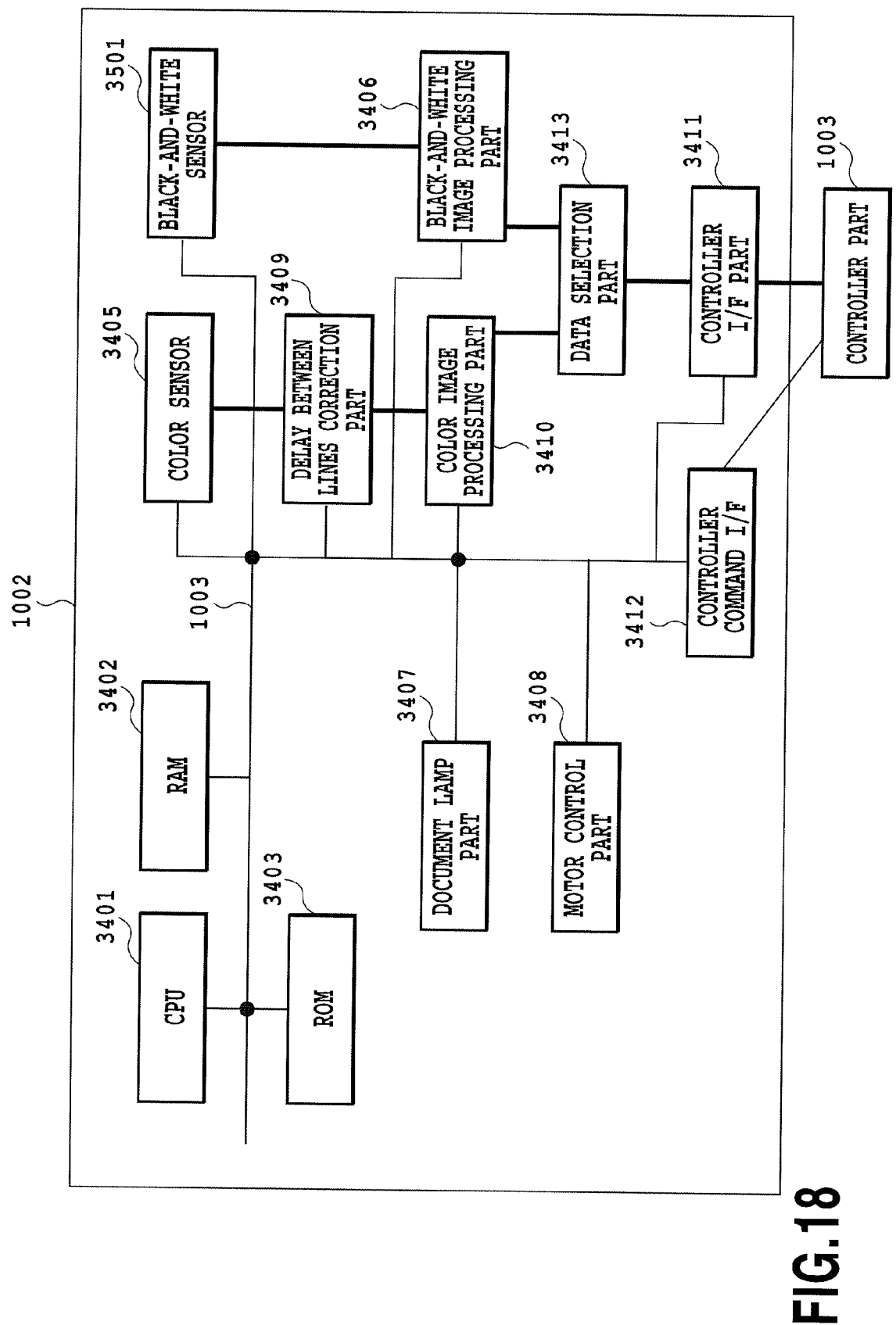
FIG. 18 is a block diagram showing a configuration of an image reading device in a sixth embodiment of the present invention.

Second scanner configuration: A configuration as shown in FIG. 18 to be described later, in which a color sensor for the color scan mode and a black-and-white sensor for the black-and-white scan mode are both provided. With the configuration, it is possible to improve image quality and reduce the burden of processing by using a dedicated sensor in the black-and-white scan mode.

The scanner for reading a document can comprise two modes, that is, the color scan mode to obtain color image data and the black-and-white scan mode to obtain black-and-white image data. By performing the copying operation in the black-and-white scan mode, it is possible to suppress the running cost because only black toner and black ink are used by a printer part when forming an image.

Consequently, if the cost is taken into consideration, there may be a case where it is preferable to scan a document into which LVBC using color dots is embedded so as to be less conspicuous as described above in the black-and-white scan mode. Further, in LVBC using color dots, the dots are originally inconspicuous and when the dots are embedded in a document, a black-and-white image, there may be a case where a user who tries to scan does not notice the formation of the color dots. In this case, the user has a high possibility of selecting the black-and-white scan mode even if the user does not care about the cost.

As described above, when a document into which LVBC using color dots is embedded is scanned, the controller part 1003 detects the color dots in the black-and-white scan mode as a result and this may lead to the following problems.

The image data read by the scanner part 1002 is subjected to complicated image processing, such as gamma conversion and edge enhancement as previously described. Further, this also applies to color to black-and-white conversion. Here, in order to explain the problem when color dots are read in the black-and-white scan mode, the explanation is given in a simplified form. The complicated image processing, such as gamma conversion and edge enhancement, is omitted from the explanation. In addition, the algorithm of color to black-and-white conversion will be described with an example of the simplest method. That is, an average of R, G, and B is calculated simply as shown in (formula 1).

$$K=(R+G+B)/3 \qquad \text{(formula 1)}$$

Here, it is assumed that the value of black-and-white is K (black) and the values of colors are R (red), G (green), and B (blue), respectively. K, R, G, and B are assumed to have eight bits, respectively, and take a value in a range between 0 and 255.

A white part on a document is read as R=255, G=255, and B=255 in the color scan mode. In the black-and-white scan mode, K=255 is obtained by using the above formula 1 described above. This is the maximum luminance value. A black part on the document is read as R=0, G=0, and B=0 in the color scan mode. In the black-and-white scan mode, K=0. This is the minimum luminance value.

When the black dot is adopted, the closer the value is to zero, the higher the possibility that the part of the dot is recognized as a dot.

On the other hand, a yellow part on the document is read as R=255, G=255, and B=0 in the color scan mode. In the black-and-white scan mode, K=170 is obtained by using (formula 1). Similarly, a cyan part is read as R=255, G=0, and B=255 in the color scan mode. In the black-and-white scan mode, K=170 is obtained by using (formula 1) (refer to Table 1).

When the yellow dot and the cyan dot are read in the black-and-white scan mode, K=170, which is a very large figure compared to K=0 of the black dot, and therefore, there arises a problem that the detection rate is lowered.

Here, if the value of B is used for the detection of the yellow dot and the value of G is used for the detection of the cyan dot instead of K, the values are zero and the detection rate is the same as that of the black dot.

<Outline of Copy Preventing Operation>

Next, a copy preventing operation in the image forming device will be described briefly.

When a user attempts to copy a print output including copy prohibition information as shown in FIG. 4 using the image forming device 1001, the image forming device 1001 senses that the object to be copied includes copy prohibition information and controls the copying operation. For example, when information indicative of copy prohibition is embedded in the object to be copied, the image forming device 1001 aborts the copying operation. Due to this, an important document is prevented from being copied.

<Copy Prohibiting Operation in Copying>

Figure 8:
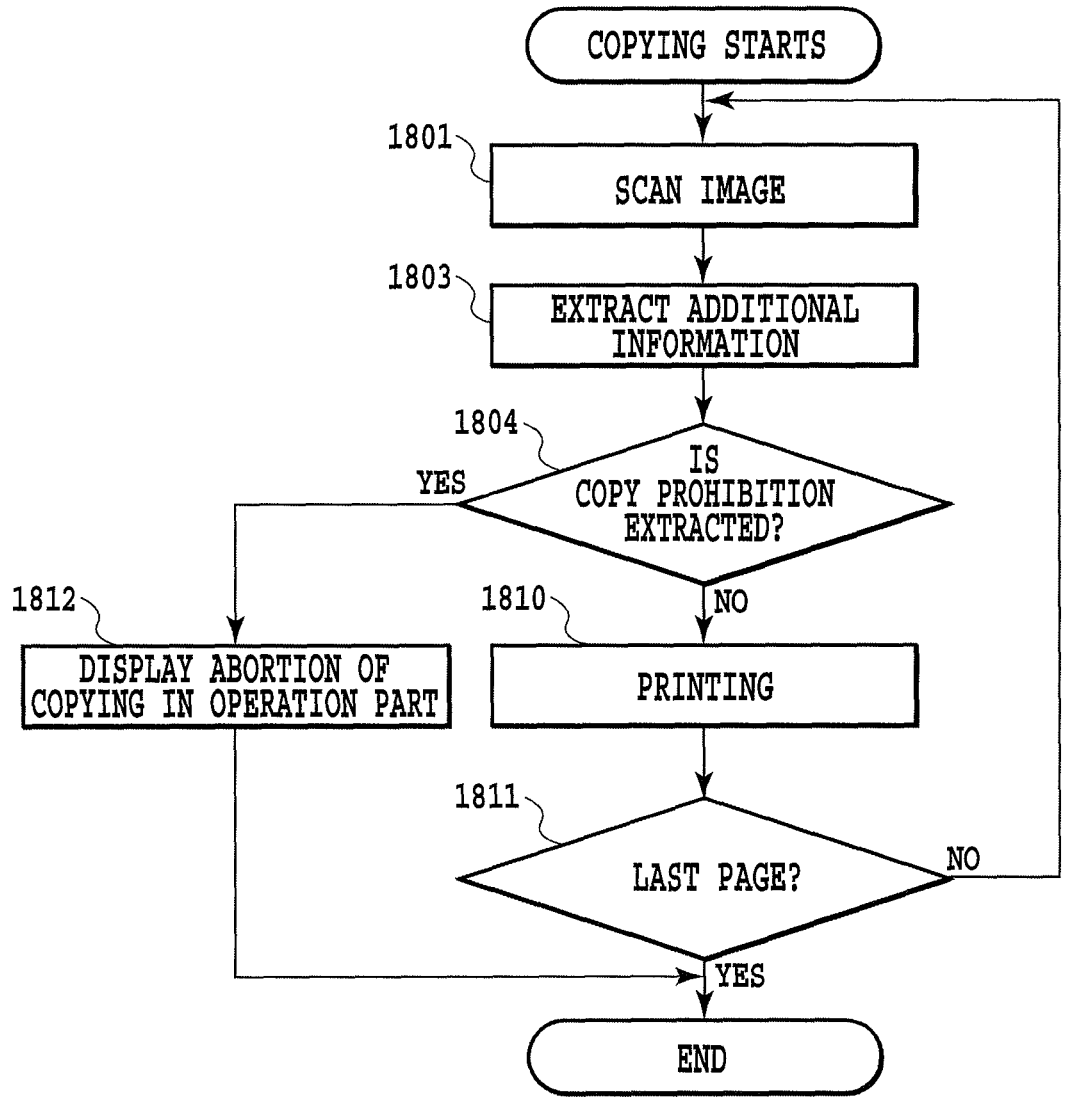
FIG. 8 is a flow chart diagram for explaining a copy prohibiting operation in an embodiment of the present invention.

Next, a copying operation in the image forming device 1001 implementing a function to prevent illegal copying will be described using the flowchart in FIG. 8.

When a user gives an instruction to start copying, the scanner part 1002 reads image data from a document placed on a platen of the scanner part 1002 and sends the read image data to the embedded information extraction part 3310 (S1801). The embedded information extraction part 3310 extracts additional information by using the previously described information embedding technique on the image data received from the scanner part 1002 in S1803 and determines whether or not additional information indicative of copy prohibition is embedded in S1804. That is, the embedded information extraction part 3310 determines whether or not the image data includes additional information (code image information) and when the result of the determination is affirmative, it extracts the additional information. Then, the embedded information extraction part 3310 determines whether or not the extracted additional information is one indicative of copy prohibition based on the extracted additional information. When no additional information is extracted, the printing processing is continued.

Figure 5:
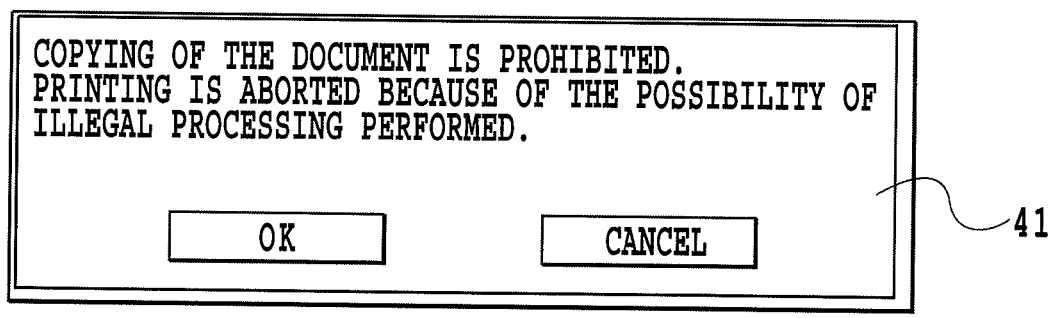
FIG. 5 is a diagram showing a dialog box that appears at a display part when copying is prohibited in an embodiment of the present invention.

When copy prohibition is extracted (YES in S1804), a CPU 2201 of the controller 1003 determines to abort the copying operation and aborts the copying operation in S1812. At this time, the CPU 2201 displays a dialog box as shown in FIG. 5 in the operation part 1004 and notifies the user that printing is not performed because it is an illegal copying operation (S1812). If copying is not prohibited in S1804, the CPU 2201 prints the image data in step 1810 in order to continue the copying operation. When the target page is the last page, the CPU 2201 ends the copying operation in S1811. When the target page is not the last page, the CPU 2201 returns the procedure to step 1801 and performs the control to read the next page.

FIG. 5 is an example of a screen to be displayed in S1812 described previously. A message dialog box 41 is displayed to notify the user that the copying operation is aborted.

Embodiments of the present invention will be described next with reference to the drawings using the configuration of the system suitable for the application to the one embodiment of the present invention described above.

First Embodiment

A first embodiment is premised on an embodiment in which the scanner part 1002 having the color sensor 3405 as shown in FIG. 3 is used. An example will be described, in which bits 23 to 16 of the image data bus, which is not used, are used for the transfer of color image data for the detection of a color code image when one pixel is transferred per clock in the black-and-white scan mode, as shown in FIG. 12. In the present embodiment, the color image data for the detection of a color code image utilizes a monochrome.

Figure 10:
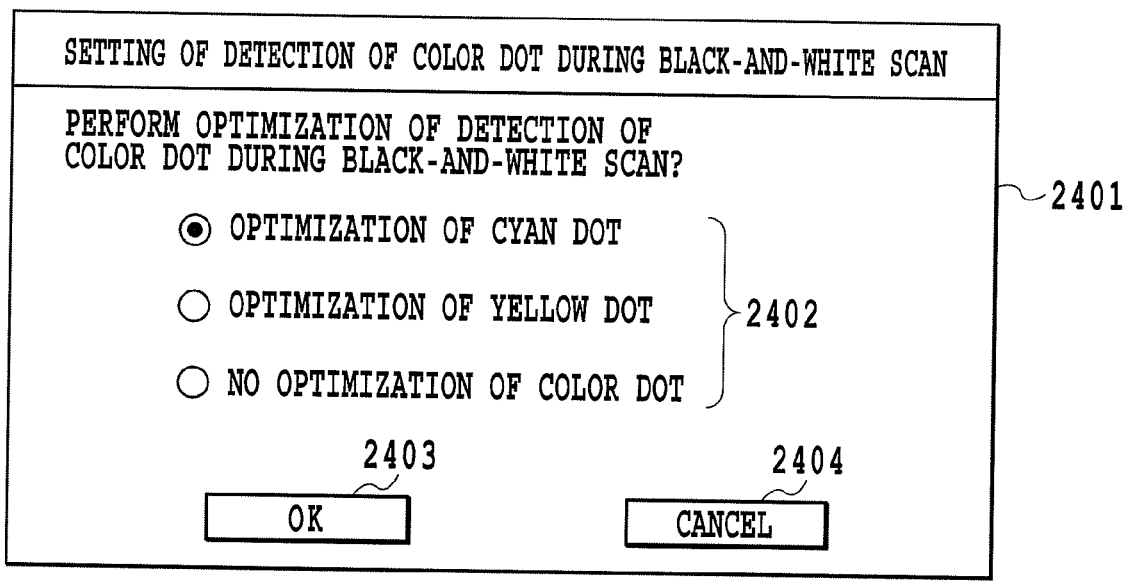
FIG. 10 is a diagram showing a screen example of an operation part in a first embodiment of the present invention.

FIG. 10 is a screen example of the operation part 1004 with which the detection of a color code image is set in the present embodiment. In a screen 2401 for setting the detection of a color code image in the black-and-white scan mode, a radio button 2402 is used to select one from three alternatives. In FIG. 10, the optimization of the detection of the cyan dot is selected. Other alternatives are the optimization of the detection of the yellow dot and no optimization of a color code image. That is, in the present embodiment, LVBC is constituted by the cyan dot and when the detection of the cyan dot is desired in the black-and-white scan mode, it is recommended to select "optimization of cyan dot". Similarly, when the detect of the yellow dot is desired, it is recommended to select "optimization of yellow dot".

In this manner, the alternative selected by the user with the radio button 2402 is the setting of the detection of a color code image. That is, when the user selects a desired alternative with the radio button 2402 and presses an OK button 2403 by operating the operation part 1004, the setting of the detection of a color code image is saved in the HDD 3304. It may also be possible to maintain the setting after the power of the device is turned off and turned on. A cancel button 2404 cancels the setting in the setting screen.

That is, in the present embodiment, before the dialog box shown in FIG. 10 is displayed to the user, the controller part 1003 displays a dialog box on the display part 1004 to determine the operation in the color scan mode or the operation in the black-and-white scan mode. That is, the mode selected and specified by the user is set between the color scan mode and the black-and-white scan mode based on the input by the user through the display part 1004.

When the user operates the display part 1004 and selects the operation in the black-and-white scan mode, the controller part 1003 displays the dialog box shown in FIG. 10 on the display part 1004 in accordance with the selection. At this time, when the user inputs an instruction relating to the detection of the color dot in the black-and-white scan mode through the display part 1004, the controller part 1003 receives the input and transmits a command relating to the instruction input by the user to the scanner part 1002. In the case of FIG. 10, the controller part 1003 transmits the command that instructs "optimization of cyan dot" to the scanner part 1002 via the communication bus 2508.

Next, the operation of the scanner 1002 that has received the instruction (command) relating to the detection of the color dot in the black-and-white scan mode from the controller part 1003 will be described.

In the present embodiment, when the cyan dot is optimized, R that is the complementary color of cyan is selected as color image data for the detection of a color code image. Alternatively, when the yellow dot is optimized, B that is the complementary color of yellow is selected. The color image data for the detection of a color code image selected in this manner is transmitted from the scanner part 1002 to the controller part 1003 along with the black-and-white image data.

In the present embodiment, the information about the color desired to be detected for a color code image is sent as a command from the controller part to the scanner part, and it is recommended to set in advance the above-mentioned color desired to be detected and the color of the color image data for the detection of a color code image. That is, in the present embodiment, the color sensor 3405 outputs the data of three colors R, G, and B (luminance signals) and the color of a color code image desired to be detected is associated with the data of the three colors R, G, and B. By such an association, the scanner part 1002, when acquiring a color desired to be detected by analyzing the command from the controller part 1003, can acquire color image data corresponding to the color for the detection of a color code image. In the present embodiment, the color image data for the detection of a color code image is the color image data for any one of R, G, and B corresponding to the color desired to be detected.

On the other hand, when the optimization of the color dot is not performed, the color data for the detection of a color code image is not transferred. That is, only the black-and-white image data is transmitted from the scanner part 1002 to the controller part 1003.

The flow of image data when the optimization of the cyan dot is performed as shown in the screen will be described using FIG. 3 previously described.

When receiving a command of instruction to perform the "optimization of cyan dot" via the communication bus 2508, the scanner part 1002 drives the motor control part 3408 and the document lamp part 3407 and scans a document. Due to the scanning, the color sensor 3405 receives light reflected from the document and outputs the luminance signal of each color of R, G, and B.

The data transferred from the color sensor 3405 to the delay between lines correction part 3409 is subjected to image processing in the color image processing part 3410. Here, the color image processing part 3410 selects the luminance signal of R from among the luminance signals acquired from the color sensor 3405 as the color image data (color data) for the detection of a color code image and performs edge enhancement processing so as to adapt to the detection of a color code image. At this time, it may also be possible to convert each of the luminance signals of colors of R, G, and B output from the color sensor 3405 into color image data at the color image processing part 3410 and extract only the color image data of R as color data after the conversion. That is, the scanner part 1002 generates color data from the color output obtained from the color sensor 3405.

At the same time, the delay between lines correction part 3409 outputs the data (luminance signal) output to the color image processing part 3410 also to the black-and-white image processing part 3406 and performs image processing also at the black-and-white image processing part 3406. That is, the black-and-white image processing part 3406 generates black-and-white image data from the color output obtained from the color sensor 3405.

The data selection part 3413 assigns black-and-white image data to bits 7 to 0 of the image data bus 2512, assigns color data to bits 23 to 16 of the image data bus 2512, and then transmits the data to the controller part 1003.

The embedded information extraction part 3310 of the controller part 1003 detects the color code image using bits 23 to 16 of the image data bus 2512 and detects the black-and-white code image using bits 7 to 0 of the image data bus 2512.

Figure 14:
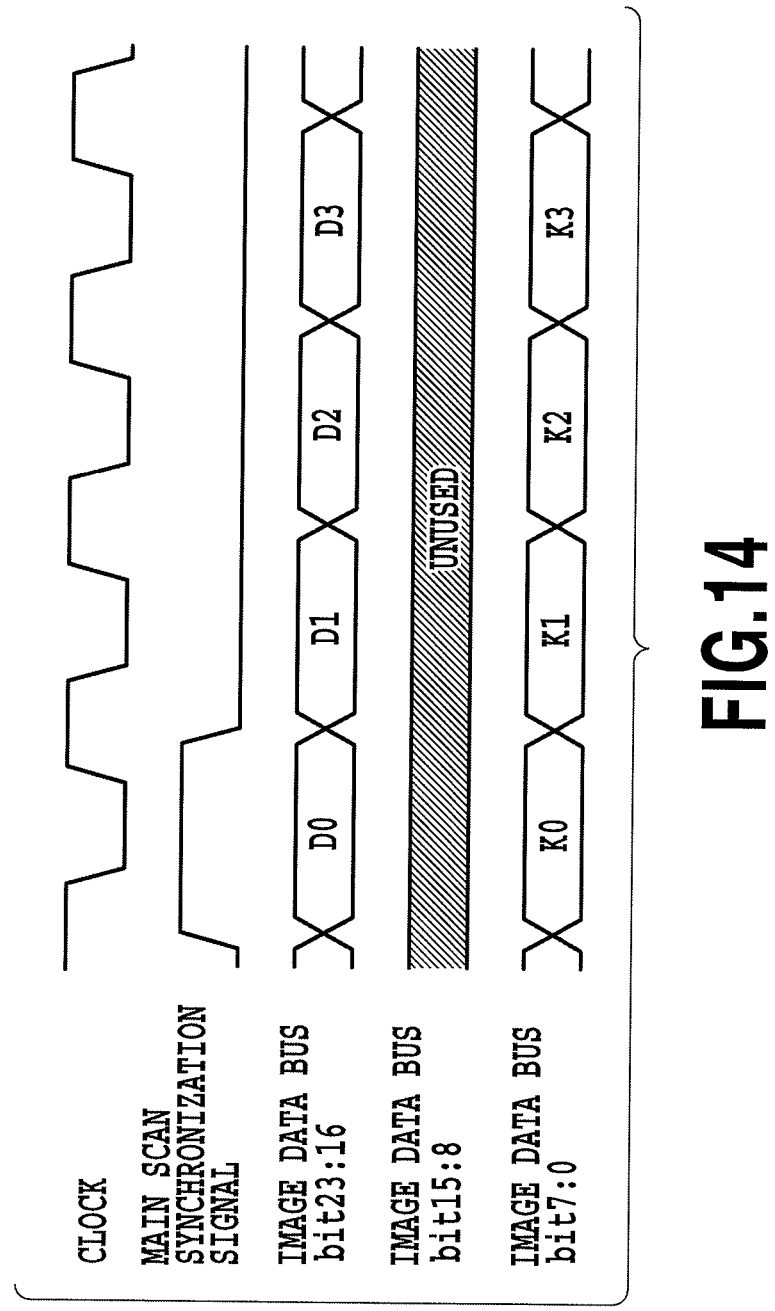
FIG. 14 is a diagram showing waveforms of image data to be transferred to the image processing device by the image reading device in the first embodiment of the present invention.

Next, FIG. 14 is a diagram showing examples of waveforms of image data to be transmitted from the scanner part 1002 to the controller part 1003 in the present embodiment. As can be seen from FIG. 14, bits 23 to 16 of the image data bus 2512 are the color image data to be used for the detection of a color code image. The color data is transferred in synchronization with the black-and-white image data. Among the image data transferred in this manner, the black-and-white image data is used in printing, however, the color image data for the detection of a color code image is not used in printing. In the present embodiment, the color image data to be transmitted from the scanner part 1002 to the controller part 1003 at the time of black-and-white scanning is only the image data used for the detection of a color code image and it is not concerned with printing actually. Consequently, the print result is a black-and-white image and the goal to reduce the running cost can be achieved, which is an advantage of the black-and-white scan mode.

The controller part 1003 analyzes a code image in a document from both the above-mentioned color image data for the detection of a color code image and the black-and-white image data. That is, in the present embodiment, the black-and-white scan mode is set and black-and-white image data is used at the time of printing, however, for the analysis of the code image, both the black-and-white image data and the color image data for the detection of a color code image are used. Consequently, even when the code image is a color image, it is possible to carry out with high precision the analysis of the code image in the black-and-white scan mode.

Then, when the additional information obtained by analyzing the code image in the black-and-white scan mode is the information about copy prohibition, the controller part 1003 determines not to perform printing based on the black-and-white image data. That is, the controller part 1003 analyzes the code image in the document using the black-and-white image data and the color image data for the detection of a color code image when printing the black-and-white image data and determines whether or not to print based on the analysis result. Because of this, it is possible to reflect an instruction included in additional information in the image forming operation.

In this manner, the scanner part 1002 performs the acquiring operation of the above-mentioned color image data for the detection of a color code image in accordance with the instruction relating to the detection of the color dot (color code image) in the black-and-white scan mode, which the controller part 1003 has transmitted to the scanner part 1002. Consequently, the controller part 1003 controls the scanner part 1002 so as to receive the color image data for the analysis of the color code image even when the black-and-white scan mode is set, as a result.

In the present embodiment, the fact is utilized that the number of buses necessary for the controller part to receive color image data from the scanner part in the color scan mode is larger than the number of buses necessary to receive black-and-white image data in the black-and-white scan mode. That is, by utilizing the above-mentioned difference in the number of buses and using the unused bus in the black-and-white scan mode, that is, the unused signal of the scan I/F, the transmission of the color image data for the detection of a color code image is performed. Because of this, when color image data is used in order to increase the recognition rate of a code image in the black-and-white scan mode, the modification of the hardware configuration, such as an increase in the number of the scan I/F signals, is not necessary. It is therefore possible to properly perform the detection of a color code image using a conventional hardware configuration.

As described above, also in the black-and-white scan mode, it is made possible to detect a color code image by sending color image data using the unused image data bus and extracting embedded information. The black-and-white scanning operation does not cause troubles, such as deterioration in image quality and degradation of performance.

Second Embodiment

In the first embodiment, the example is described, in which a monochrome is used as color image data for the detection of a color code image. In this example, the optimization of the cyan dot or the yellow dot is performed, and therefore, it is possible to properly detect the color dot corresponding to the selected color. However, in LVBC that uses the color dot, there may be a case where two colors of cyan and yellow dots are used as the color dot. Consequently, it is preferable to increase the detection rate also in the detection of the color code image not selected in the first embodiment.

In the present embodiment, an example will be described, in which color image data obtained by the operation of signals of R and B acquired by the color sensor is transferred in order to realize the coexistence of both the detections of the cyan dot and the yellow dot in the configuration of the first embodiment.

Figure 19:
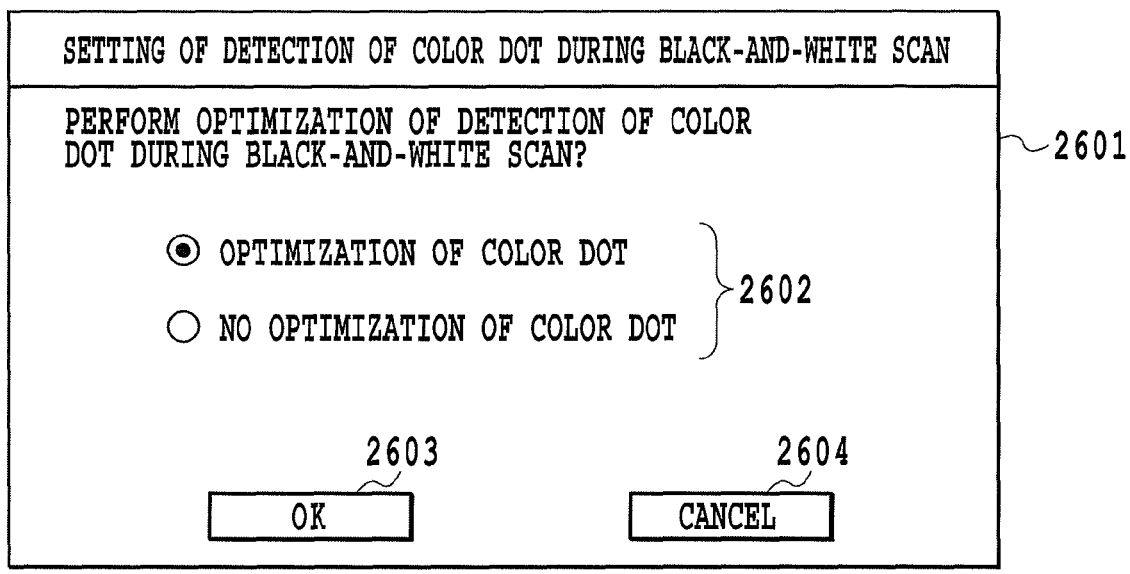
FIG. 19 is a diagram showing a screen example of an operation part in the second embodiment of the present invention.

FIG. 19 is a screen example of the operation part 1004 with which the detection of a color code image is set in the present embodiment. In a screen 2601 for setting the detection of a color code image in the black-and-white scan mode, a radio button 2602 is used to select one from among two alternatives. In FIG. 19, the optimization of the detection of a color code image is selected. The other alternative is that the optimization of the detection of a color code image is not performed. By pressing an OK button 2603, the setting of the detection of a color code image is saved in the HDD 3304. It is possible to maintain the setting after the power of the device is turned off and turned on. A cancel button 2604 aborts the setting in the setting screen.

That is, when a user inputs as shown in FIG. 19, the controller part 1003 transmits the command of instruction of the "optimization of color dot" (instruction relating to the detection of a color code image in the black-and-white scan mode) to the scanner part 1002.

In the present embodiment, when the optimization of a color code image is performed, color image data that realizes the coexistence of both the detections of the cyan dot and the yellow dot (color image data for the detection of a color code image) is generated. The operation of R for the detection of the cyan dot and B for the detection of the yellow dot is performed. Here, R or B that has a larger numerical value is taken as the color image data. Substantially the same numerical value can be obtained when a document including the cyan dot is scanned and when that including the yellow dot is scanned and the detection of both the dots is enabled.

That is, the color image processing part 3410 takes out the data of R and B from all of the data of R, G, and B acquired by the color sensor 3405. Next, the color image processing part 3410 performs the calculation of the value of that having the larger numerical value (one having a higher concentration, that is, one having a smaller luminance value). That is, the color image processing part 3410 compares the average value of the luminance values of R with the average value of the luminance value of B, of all the pixels.

As described above, in the second embodiment, both the detection of the cyan dot and the detection of the yellow dot are allowed to coexist in the black-and-white scan mode.

In the present embodiment, it is not essential to allow both the detection of the cyan dot and the detection of the yellow dot as a color code image to coexist in the black-and-white scan mode. In the present embodiment, it is more important to make it possible to properly detect a color code image also when the color code image is composed of two or more colors. Consequently, the color image data for the detection of a color code image is found by the operation of the data of two or more colors of each data of R, G, and B (color data; luminance signal) output from the color sensor 3405.

Third Embodiment

In the first embodiment, the example is described, in which color data is transferred in the black-and-white scan mode in which one pixel is transferred per clock. In the present embodiment, an example will be described, in which bits 23 to 16 of the unused image data bus are used to transfer color image data for the detection of a color code image when two pixels are transferred per clock in the black-and-white scan mode as shown in FIG. 13. In the present embodiment, the color image data for the detection of a color code image utilizes a monochrome.

Figure 15:
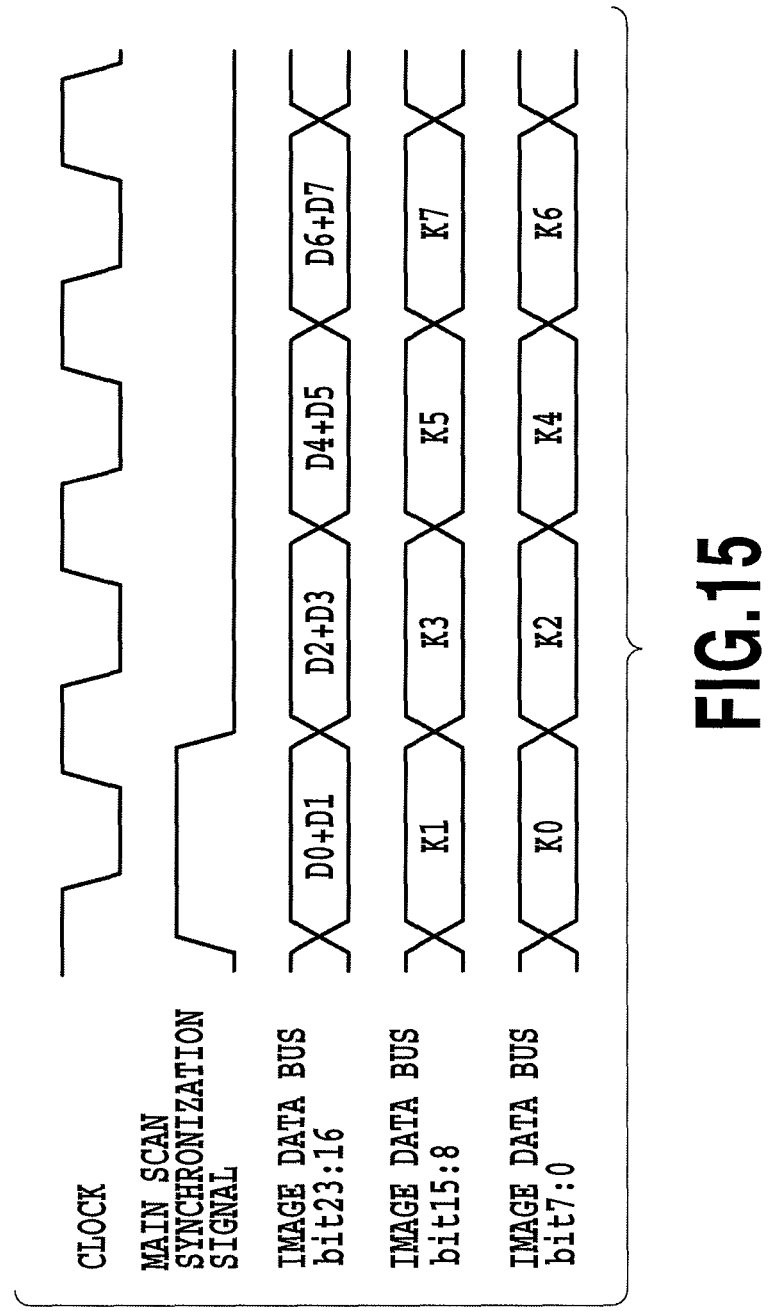
FIG. 15 is a diagram showing waveforms of image data to be transferred to an image processing device by an image reading device in a third embodiment of the present invention.

FIG. 15 is a diagram showing examples of waveforms of image data to be transmitted from the scanner part 1002 to the controller part 1003 in the present embodiment.

In FIG. 15, to bits 23 to 16 of the image data bus 2512, color image data used for the detection of a color code image is assigned. The color image data for the detection of a color code image is transferred in synchronization with the black-and-white image data. In the black-and-white image data, two pixels are transferred per clock. That is, in the present embodiment, in order to facilitate the separation between the black-and-white image data and the color image data in the controller part 1003, the color image data for the detection of a color code image is synchronized with the black-and-white image data. However, the unused image data bus is eight bits, and therefore, in the color image data, four bits are assigned to one pixel and eight bits, which correspond to two pixels, are assigned.

The scanner part 1002 uses a memory in the data selection part 3413 and assigns eight bits corresponding to two pixels in the above-mentioned color image data for the detection of the color code image. When the monochrome 8-bit color image data is converted into 4-bit data, four bits are selected from the most significant bits (MSB) having larger weight and the remaining four bits are discarded.

As described above, also in the black-and-white scan mode in which two-pixel parallel transfer is performed, it is made possible to detect a color code image by sending color image data using the unused image data bus and extracting embedded information. Eight-bit data 10000000 indicates 128 and the four bits of MSB of this data correspond to 1000 in the first half. That is, bits having the big influence are selected.

Fourth Embodiment

In the third embodiment, the example of the transmission of color data in the two-pixel parallel transfer is described. In the present embodiment, as another method, an example will be described, in which color image data for the detection of a color code image is transmitted by utilizing unused time. As explained in FIG. 20, in most cases, the scan rate in the black-and-white is about 1.2 times the scan rate in the color scan mode. Because of this, there exists unused time (time margin). For example, when it is assumed that one scan takes one second in the black-and-white scan mode, it will take about 1.2 seconds in the color scan. Consequently, in the corresponding color scan, the data of all the pixels is transferred in about 1.2 seconds. On the other hand, in the black-and-white scan, data is transferred in two-pixel parallel, and therefore, it is possible to transfer the data of all the pixels in about 0.6 seconds. As a result, there exists a time margin of about 0.4 seconds as a result of subtraction. This unused time occurs from the difference between the data transfer rates of the bus necessary to transfer image data from the scanner part to the controller part between the black-and-white scan mode and the color scan mode.

Figure 16:
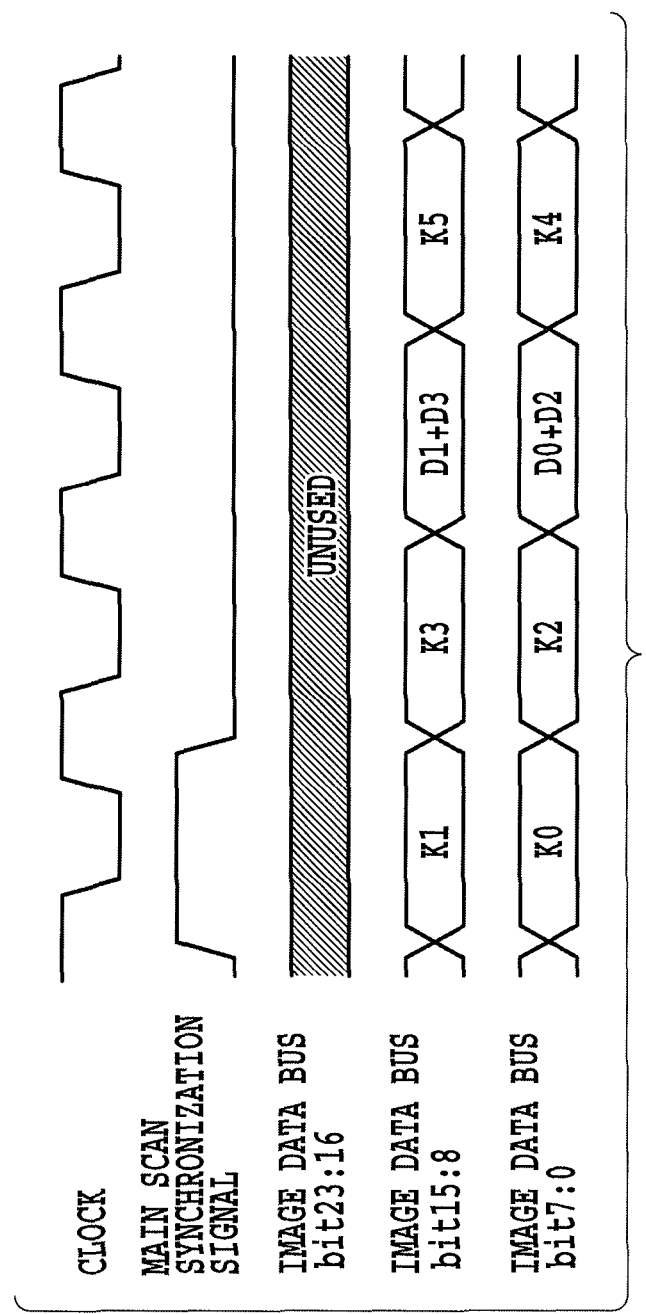
FIG. 16 is a diagram showing waveforms of image data to be transferred to an image processing device by an image reading device in a fourth embodiment of the present invention.

FIG. 16 is a diagram showing examples of waveforms of image data to be transmitted from the scanner part 1002 to the controller part 1003 in the present embodiment.

In FIG. 16, black-and-white image data is transferred using bits 15 to 0 of the image data bus. Then, the scanner part 1002 transmits color image data for the detection of a color code image corresponding to four pixels in the clock (D1+D3 and D0+D4) next to the clock (K0, K1, K2, K3) in which black-and-white image data corresponding to four pixels has been transmitted in two clocks. Consequently, the black-and-white image data corresponding to four pixels and the color image data for the detection of a color code image are transmitted in three clocks. Even in this case, however, the scan rate is 1.25 times higher than that in the color scan mode. Consequently, when the scan rate in the black-and-white scan mode is 1.25 times or less than the scan rate in the color scan mode, it is unlikely that the transfer time of image data when the present embodiment is applied increases.

In the present embodiment also, as in the third embodiment, the scanner part 1002 assigns four bits for each pixel in the color image data for the detection of a color code image, assigning eight bits corresponding to two pixels. That is, as in the third embodiment, assignment is done using a memory in the data selection part 3413. When the monochrome 8-bit color image data is converted into 4-bit data, four bits are selected from the most significant bits (MSB) having larger weight and the remaining four bits are discarded After the waveforms (image data) shown in FIG. 16 are input to the scanner image processing part 3312 of the controller part 1003, the scanner image processing part 3312 separates black-and-white image data and color image data from the input image data as scan image data.

The scanner image processing part 3312 has a ternary counter that is cleared to zero by a main scan synchronization signal. The ternary counter increments the count in order of 0, 1, and 2 in synchronization with the image clock 2515 and the count after 2 is 0. When the value of the ternary counter is 0 and 1, the data is recognized as scan image data and after being subjected to image processing, it is transferred to the compression part 3313. When the value of the ternary counter is two, the data is determined to be color image data and it is transferred to the embedded information extraction part 3310.

As described above, in the present embodiment, by positively using the fact that the above-mentioned data transfer rate when the black-and-white scan mode is set differs from that when the color scan mode is set, black-and-white image data and color image data for the detection of a color code image are transmitted without increasing the number of signals. This transmission is performed by the scanner part 1002 according to a command transmitted from the controller part 1003 to the scanner part 1002. Consequently, in the present embodiment, the controller part 1003 controls the scanner part 1002 so as to receive color image data to analyze a color code image from the scanner part 1002 using time generated from the difference in the data transfer rate, as a result.

As described above, also in the black-and-white scan mode in which the two-pixel parallel transfer is performed in a method different from that in the third embodiment, it is made possible to detect a color code image by sending color image data using the unused image data bus and extracting embedded information.

Fifth Embodiment

In the third and fourth embodiments, the example of the transmission of color image data for the detection of a color code image in the two-pixel parallel transfer is described. In these embodiments, there is a possibility that the detection rate of a color code image may be degraded because the number of bits of the color image data is reduced to four. Because of this, in the present embodiment, an example will be described, in which the number of bits of color data is set to eight per pixel. Here, the present embodiment is compared with the third embodiment and the fourth embodiment. First, in the third embodiment, the unused time is not utilized. On the other hand, in the fourth embodiment, bits 23 to 16 of the image data bus are not used. In the present embodiment, both of them are utilized positively for the transfer of color image data for the detection of a color code image.

Figure 17:
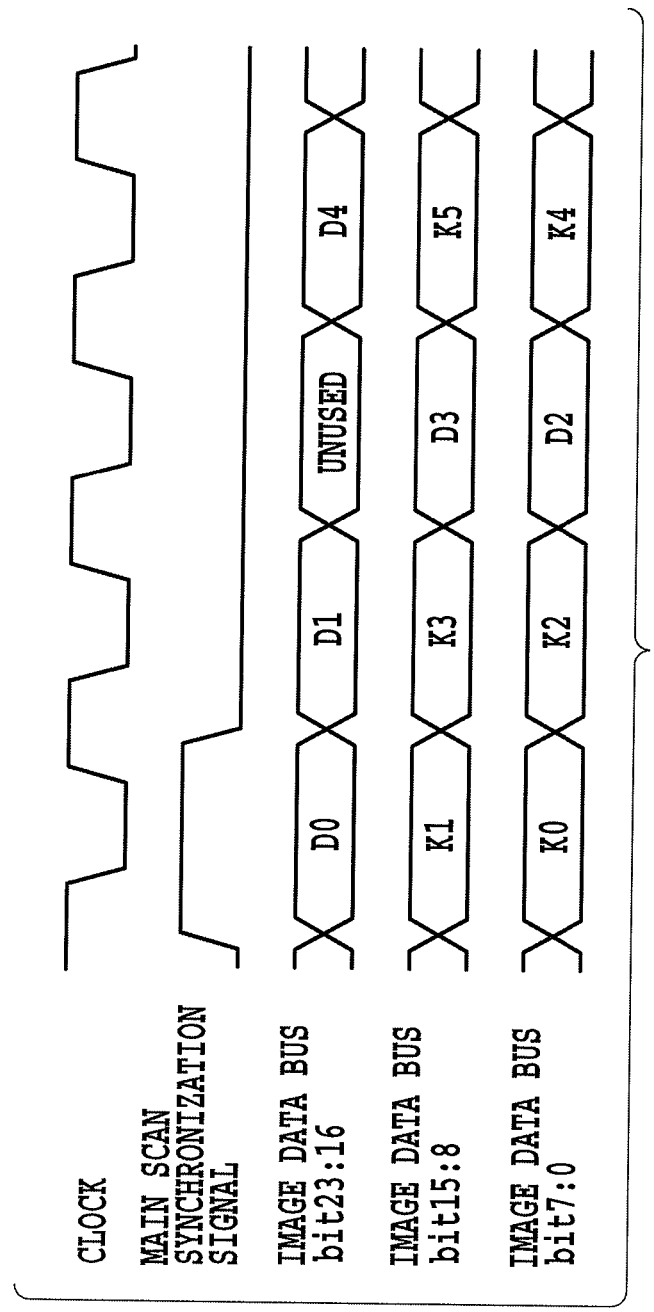
FIG. 17 is a diagram showing waveforms of image data to be transferred to an image processing device by an image reading device in a fifth embodiment of the present invention.

FIG. 17 is a diagram showing examples of waveforms of image data to be transmitted from the scanner part 1002 to the controller part 1003 in the present embodiment.

In FIG. 17, to bits 23 to 16 of the image data bus, color image data used for the detection of a color code image is assigned. Consequently, it is possible for the scanner part 1002 to transfer black-and-white image data corresponding to four pixels and color image data for the detection of a color code image corresponding to two pixels in two clocks. Color image data for the detection of a color code image corresponding to the remaining two pixels is transferred using bits 15 to 0 of the image data bus in the next one clock. Due to this, it is possible to transfer four pixels in three clocks as in the fourth embodiment.

After the waveforms (image data) shown in FIG. 17 are input to the scanner image processing part 3312 of the controller part 1003, the scanner image processing part 3312 separates black-and-white image data and color image data as scan image data from the input image data.

The scanner image processing part 3312 has a ternary counter that is cleared to zero by a main scan synchronization signal as in the fourth embodiment. When the value of the ternary counter is 0 and 1, bits 15 to 0 are recognized as scan image data and after being subjected to image processing, it is transferred to the compression part 3313. Bits 23 to 16 are determined to be color image data and transferred to the embedded information extraction part 3310. When the value of the ternary counter is two, it is determined to be color image data corresponding to two pixels and transferred to the embedded information extraction part 3310.

As described above, in the present embodiment, the scanner part 1002 transmits black-and-white image data and color image data for the detection of a color code image by positively using the unused image data bus and the unused time in the black-and-white scan mode without increasing the number of signals. This transmission is performed by the scanner part 1002 according to a command transmitted from the controller part 1003 to the scanner part 1002. Consequently, in the present embodiment, the controller part 1003 controls the scanner part 1002 so as to receive color image data for the detection of a color code image from the scanner part 1002 using the following two differences between the period of the black-and-white scan mode and the period of the color scan mode. The first difference lies in the number of image data buses and the second difference lies in the data transfer rate.

As described above, also in the black-and-white scan mode in which the two-pixel parallel transfer is performed, it is possible to send color image data for the detection of a color code image of eight bits per pixel using the unused image data bus and the unused time. Due to this, it is made possible to detect a color code image by extracting embedded information.

Sixth Embodiment

In the first embodiment to the fifth embodiment, the device in which the scanner part 1002 has only a color sensor is described. However, there is a possibility that the image quality is improved when a black-and-white sensor that outputs black-and-white data is used than when color image data is converted into black-and-white image data, and therefore, there is a scanner device that has both a color sensor and a black-and-white sensor. In such a device, the flow of image data is different and therefore the difference of the present embodiment from the previously described embodiments will be described.

FIG. 18 is a block diagram showing an internal structure of the scanner part 1002 of the present embodiment. In the present embodiment, in addition to the configuration explained in FIG. 3, a black-and-white sensor 3501 is added. During the period of scanning, the black-and-white sensor 3501 moves integrally with the color sensor 3405. In the delay between lines correction part 3409 that corrects a delay between lines of color image data, a delay is made so as to synchronize with the black-and-white image data. The black-and-white image data that the black-and-white sensor 3501 outputs is input to the black-and-white image processing part 3406. The subsequent operations are the same as those in the first embodiment to the fifth embodiment.

As described above, according to an embodiment of the present invention, also when scanning is performed in the black-and-white scan mode, it is possible to simultaneously obtain color image data for the detection of a color code image by utilizing the unused bus and time and it is made possible to detect a color code image.

Other Embodiments

It is possible to apply the present invention not only to a system constituted by a plurality of devices (for example, computer, interface device, reader, printer, etc.) but also to a device constituted by only one device (composite device, printer, facsimile device, etc.).

A processing method, in which programs to operate the configurations of the previously described embodiments to realize the functions of the previously described embodiments are stored in a recording medium, and the programs stored in the recording medium are read as code and executed in a computer, is also included in the scope of the above-described embodiments. That is, a computer readable recording medium is also included in the embodiments. Further, not only the recording medium in which the previously described computer programs are stored but also the computer programs themselves are included in the above-described embodiments.

As a recording medium, for example, floppy (registered trademark) disc, hard disc, optical disc, magneto-optical disc, CD-ROM, magnetic tape, nonvolatile memory card, and ROM can be used.

Further, not limited to those which perform processing by the program alone stored in the previously described recording medium, those which operate on an OS and perform the operations in the previously described embodiments in cooperation with the functions of other software and extension board are also included in the scope of the previously described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structure and functions.

This application claims the benefit of Japanese Patent Application No. 2008-078909, filed Mar. 25, 2008, which is hereby incorporated by reference herein in its entirety.

What is claimed is:

1. An image processing device connected with an image reading device having a sensor that receives reflected light from a document, a component to perform image processing on data received from the sensor to acquire black-and-white image information, and a component to perform image processing on data received from the sensor to acquire color image information, the image processing device comprising:
a component to transmit an instruction relating to the detection of a color code image in a black-and-white scan mode to the image reading device;
a component to receive color image information for the detection of a color code image acquired by the component to acquire color image information, from the image reading device based on the instruction; and
a component to analyze a code image in the document from the received color image information.

2. The image processing device according to claim 1, wherein additional information included in the code image is information relating to whether or not to output image information transferred from the image reading device to a printing device, and
in order to determine whether or not to output black-and-white image information acquired by the component to acquire black-and-white image information to the printing device, the code image analyzed by the component to analyze is used.

3. The image processing device according to claim 1, wherein the black-and-white image information used to analyze the code image in the document by the component to analyze is used in printing, however, the color image information is not used in printing.

4. An image processing device connected with an image reading device having a sensor to receive reflected light from a document, a component to perform image processing on data received from the sensor to acquire black-and-white image information, and a component to perform image processing on data received from the sensor to acquire color image information, the image processing device comprising:
a component to transmit an instruction relating to the detection of a color code image in a black-and-white scan mode to the image reading device;
a component to receive color image information for the detection of a color code image acquired by the component to acquire color image information from the image reading device based on the instruction;
a component to determine whether or not to output black-and-white image information acquired by the component to acquire black-and-white image information to a printing device; and
a component to analyze a code image in the document from the received color image information for a determination by the component to determine.

5. An image processing device connected with an image reading device having a black-and-white sensor and a color sensor that receive reflected light from a document, the image processing device comprising:
a component that transmits an instruction relating to the detection of a color code image in a black-and-white scan mode to the image reading device;
a component that receives information received via the black-and-white sensor and information received via the color sensor from the image reading device based on the instruction; and
a component that analyzes a code image in the document from the information received via the color sensor.

6. The image processing device according to claim 5, wherein
additional information included in the code image is information relating to whether or not to output image information transferred from the image reading device to a printing device, and
in order to determine whether or not to output black-and-white image information acquired by the component acquiring black-and-white image information to the printing device, code image analyzed by the analyzing component is used.

7. An image processing device connected with an image reading device having a black-and-white sensor and a color sensor that receive reflected light from a document, the image processing device comprising:
a component that transmits an instruction relating to the detection of a color code image in a black-and-white scan mode to the image reading device;

a component that receives information the black-and-white sensor has received and information the color sensor has received, from the image reading device based on the instruction;

a component that determines whether or not to cause a printing device to execute printing based on the received information the black-and-white sensor has received; and a component that analyzes a code image in the document using both the received information the black-and-white sensor has received and the received information the color sensor has received for a determination by the determining component.

8. An image reading device connected with an image processing device having a component that analyzes a code image in a document, the image reading device comprising:

a sensor that receives reflected light from the document;

a component that performs image processing on data received from the sensor to acquire black-and-white image information;

a component that performs image processing on data received from the sensor to acquire color image information; and a component that receives an instruction relating to the detection of a color code image in a black-and-white scan mode from the image processing device, wherein when receiving the instruction from the receiving component, the component acquiring color image information acquires color image information for the detection of a color code image from the data received from the sensor, and transmits the acquired color image information for the detection of a color code image and black-and-white image information used in printing to the image processing device.

9. The image reading device according to claim 8, wherein the sensor is a color sensor.

10. The image reading device according to claim 8, wherein the sensor includes a color sensor that outputs color data and a black-and-white sensor that outputs black-and-white data, the component acquiring black-and-white image information acquires the black-and-white image information from the black-and-white data output from the black-and-white sensor, and the component acquiring color image information acquires the color image information from the color data output from the color sensor.

11. An image processing method in an image processing device connected with an image reading device having a sensor that receives reflected light from a document, a component that performs image processing on data received from the sensor to acquire black-and-white image information, and a component that performs image processing on data received from the sensor to acquire color image information, the method comprising the steps of:

transmitting an instruction relating to the detection of a color code image in a black-and-white scan mode to the image reading device;

receiving color image information for the detection of a color code image the component acquiring color image information has acquired from the image reading device based on the instruction; and analyzing a code image in the document from the received color image information.

* * * * *